United States Patent [19]
Abecassis

[11] Patent Number: 6,067,401
[45] Date of Patent: *May 23, 2000

[54] PLAYING A VERSION OF AND FROM WITHIN A VIDEO BY MEANS OF DOWNLOADED SEGMENT INFORMATION

[76] Inventor: Max Abecassis, 19020 NE. 20 Ave., Miami, Fla. 33179

[ * ] Notice: This patent is subject to a terminal disclaimer.

[21] Appl. No.: 08/988,943

[22] Filed: Dec. 11, 1997

Related U.S. Application Data

[62] Division of application No. 08/954,535, Oct. 20, 1997, which is a continuation of application No. 08/419,822, Apr. 11, 1995, abandoned, which is a division of application No. 08/002,998, Jan. 11, 1993, Pat. No. 5,434,678.

[51] Int. Cl.[7] .............................. H04N 5/781; H04N 5/76
[52] U.S. Cl. ............................................. 386/125; 386/46
[58] Field of Search .................... 386/46, 83, 124, 386/95, 92, 40, 1, 125; 348/7, 6, 12; 260/72; H04N 5/781, 5/85, 5/76

[56] References Cited

U.S. PATENT DOCUMENTS

| | | | |
|---|---|---|---|
| 4,305,131 | 12/1981 | Best | 364/521 |
| 4,449,198 | 5/1984 | Uroon et al. | 364/900 |
| 4,475,132 | 10/1984 | Rodesch | 358/342 |
| 4,520,404 | 5/1985 | Von Kohorn | 358/335 |
| 4,538,188 | 8/1985 | Barker et al. | 360/14.3 |
| 4,569,026 | 2/1986 | Best | 364/521 |
| 4,605,964 | 8/1986 | Chard | 358/147 |
| 4,685,003 | 8/1987 | Westland | 360/14.1 |
| 4,685,131 | 8/1987 | Horne | 380/20 |
| 4,729,044 | 3/1988 | Kiesel | 360/14.3 |
| 4,750,213 | 6/1988 | Novak | 455/67 |
| 4,754,342 | 6/1988 | Duffy | 360/14.3 |
| 4,766,541 | 8/1988 | Bleich et al. | 364/410 |
| 4,775,935 | 10/1988 | Yourick | 364/401 |
| 4,782,402 | 11/1988 | Kanamaru | 358/343 |
| 4,789,894 | 12/1988 | Cooper | 358/105 |
| 4,872,151 | 10/1989 | Smith | 369/14 |

(List continued on next page.)

OTHER PUBLICATIONS

Aguirre–Smith et. al. "Parsing Varies in context" Summer 1991, 157–167, MIT Media Lab.

Mackay et al. Virtual Video Editing in Interactive Multimedia Applications, Jul. '89, 802–810, Communications of ACM.

Sasnett, "Reconfigurable Video", Feb. '86, MIT.

*Primary Examiner*—Robert Chevalier

[57] ABSTRACT

A system comprising the means for, and a method of comprising the steps of, preestablishing a content preference with respect to a level of explicitness in each of plurality of content categories; downloading, by means of a communication, segment information for a video comprising a linear sequence of frames readable from a spiral track of an optical disc, the segment information directly defining at least one segment of the video with respect to a level of explicitness in at least one content category; selecting segments of the video by applying the preestablished content preference to the segment information; and playing, by means of a random accessing and buffering and from within the linear sequence of frames, a seamless version of the video less in length than the length of the video, the playing not requiring an alternate video source and comprising retrieving the selected segments and seamlessly skipping a retrieval of an at least one segment by buffering at least a portion of a segment.

20 Claims, 12 Drawing Sheets

U.S. PATENT DOCUMENTS

| | | | |
|---|---|---|---|
| 4,888,796 | 12/1989 | Olivo, Jr. | 379/101 |
| 4,930,158 | 5/1990 | Vogel | 380/5 |
| 4,930,160 | 5/1990 | Vogel | 380/23 |
| 4,949,187 | 8/1990 | Cohen | 358/335 |
| 4,979,050 | 12/1990 | Westland et al. | 360/14.1 |
| 5,060,068 | 10/1991 | Lindstrom | 358/185 |
| 5,101,364 | 3/1992 | Davenport et al. | 395/152 |
| 5,107,343 | 4/1992 | Uawai | 358/341 |
| 5,109,482 | 4/1992 | Bourman | 395/154 |
| 5,122,886 | 6/1992 | Tanaka | 358/335 |
| 5,130,792 | 7/1992 | Tindell et al. | 358/85 |
| 5,172,111 | 12/1992 | Olivo, Jr. | 340/825.31 |
| 5,175,631 | 12/1992 | Juri et al. | 358/335 |
| 5,195,135 | 3/1993 | Palmer | 380/20 |
| 5,218,672 | 6/1993 | Morgan et al. | 395/162 |
| 5,253,275 | 10/1993 | Yurt et al. | 375/122 |
| 5,267,351 | 11/1993 | Reber et al. | 395/600 |
| 5,274,463 | 12/1993 | Matsumoto et al. | 358/335 |
| 5,280,462 | 1/1994 | Yokogawa | 369/30 |
| 5,313,297 | 5/1994 | Fukui et al. | 348/7 |
| 5,367,510 | 11/1994 | Ando | 369/321 |
| 5,434,678 | 7/1995 | Abecassis | 386/83 |
| 5,521,900 | 5/1996 | Ando et al. | 369/275.1 |
| 5,546,365 | 8/1996 | Roth | 369/32 |
| 5,574,567 | 11/1996 | Cookson et al. | 386/46 |

*210*

| Code | Description | None | Implied | Explicit | Graphic |
|---|---|---|---|---|---|
| 110 | Profanity | 1 | 2 | 3 | 4 |
| 130 | Violence | 1 | 2 | 3 | 4 |
| 135 | Bloodshed | 1 | 2 | 3 | 4 |
| 150 | Monsters | 1 | 2 | 3 | 4 |
| 170 | Nudity | 1 | 2 | 3 | 4 |
| 175 | Sex | 1 | 2 | 3 | 4 |

| Code | Description | None | Minimal | Expanded | Extensive |
|---|---|---|---|---|---|
| 210 | Character | 1 | 2 | 3 | 4 |
| 220 | Location | 1 | 2 | 3 | 4 |
| 230 | Time | 1 | 2 | 3 | 4 |
| 340 | Detail | 1 | 2 | 3 | 4 |
| 420 | Expertise | 1 | 2 | 3 | 4 |

| Code | Description | Highlight | Summary | Condensed | Detailed |
|---|---|---|---|---|---|
| 610 | Inclusion | 1 | 2 | 3 | 4 |

| G | PG | PG-13 | R | NC-17 |
|---|---|---|---|---|

PLAYING A VERSION OF AND FROM WITHIN A VIDEO BY MEANS OF DOWNLOADED SEGMENT INFORMATION

This application is a division of patent application Ser. No. 08/954,535, filed Oct. 20, 1997, which is a continuation of Ser. No. 08/419,822, filed Apr. 11, 1995 now abandoned and, which is a division of Ser. No. 08/002,998, filed Jan. 11, 1993, now U.S. Pat. No. 5,434,678 issued Jul. 18, 1995.

BACKGROUND OF THE INVENTION

1. Field of the Invention

The invention relates to a video device for the automated selective retrieval of non-sequentially-stored video segments of a video program, from a single video program source, responsive to a viewer's preestablished video content preferences, and the transmission of the selected segments as a seamless video program.

2. Description of the Prior Art

Conventional memory storage devices, as for example, laser disc players and computer hard disks, when accessing or transferring data randomly located on the device's memory storage unit, the read/write functions of the device must wait for the proper positioning of the read/write head from one location to another location. This operation usually referred to as the average access time and measured in microseconds is one of the primary determinants of a random access device's performance capabilities.

In full motion picture applications a device's capabilities are also critical in terms of transfer rates and storage capacity. A typical motion picture runs at 30 frames per second. In digital terms, reasonable quality video, such as may be obtained from a VCR tape, requires approximately 1.5 megabytes per second, or a total of 10,800 megabytes for a two hour film. While the application of compression technologies reduces the storage requirements, this is offset by the greater requirements of high definition television (HDTV).

As a result of the storage capacity, transfer rates, and average access times, laser optical technology has proven its costs effectiveness in full motion picture applications. State of the art laser video disc systems, such as for example Pioneer's VDR-V1000, incorporates separate optical heads for recording and erasing, and provides an average access time of 0.3 seconds. While in most applications a 0.3 seconds average access time can be accommodated, this proves not be the case when a continuous seamless retrieval of random frame sequences from a single video source is required. A 0.3 average access time translates into a gap of 0.3 seconds (approximately 9 frames) each time a non-sequential frame needs to be retrieved. Where the viewing of a motion picture requires a significant number of such random accesses, the repeated gaps represent a significant failing.

Various data and video read and read/write architectures, such as those comprising: i) a single head; ii) multiple heads, in which each head operates on a different source surface; iii) multiple heads operating in one surface, in which each set of heads moves over the surface as a single unit; and iv) multiple heads, in which each head's movement over the shared surface and function is independent of the operation of the other heads; provide different average access time and transfer rate capabilities.

For example, the patent to Takemura et al., U.S. Pat. No. 4,744,070, discloses a tracking method for an optical disc in which two laser spots irradiate two adjoining slants of a V-shape groove. Since the laser spots movement over the disc surface are in unison, the shortcomings of access time gaps are not resolved.

With respect to the objects of the present invention, the shortcomings of the prior art known to the applicant are not limited to the hardware architecture. From the outset, film production has and continues to be directed at the eventual production of a unique linear sequence of frames.

In the creation of motion picture, producers and artists often surrender the exercise of creative expression to the inherent constraints of an unique linear sequence of frames, generally accepted norms, marketing objectives, and the censoring influence of the Motion Picture Association of America, Inc. rating system. In general, the resulting compromise inevitably provides for scenes, content, or artistic expression, which either exceeds or fails to satisfy individual viewer preferences. Too often, gains made in the exercise of creative expression result in the loss of potential audience. To that extent, recently a number of films are issued in an U.S. version, and a more explicit European version.

Viewers that are attracted by the general subject matter of a motion picture, and, on the basis of the MPAA's motion picture rating system, elect to view the motion picture are subjected to material in the program they would not have selected for their own viewing. In a 1989 poll conducted by the Associated Press, 82% of the respondents felt that movies contained too much violence, 80% found too much profanity, and 72% complained of too much nudity.

A number of editing systems in the prior art have attempted to address these issues. For example, the patent to Von Kohorn, U.S. Pat. No. 4,520,404, discloses a remote recording and editing system, whose functions include the activation or deactivation of a television receiver and a recording apparatus by the transmission of control or editing command signals, generated from a central station where an operator monitors a broadcast transmission. Similarly, the patent to Chard, U.S. Pat. No. 4,605,964, discloses a television controller that utilizes coding for identifying and automatically deleting undesirable sound and visual events broadcast with a program. The patent to Olivo, Jr., U.S. Pat. No. 4,888,796, discloses a screening device capable of automatically disabling the TV or video receiving device in response to the receiver's recognition of a non-interfering material content signal co-transmitted with the program signals. However, even the aggregation of Von Kohorn, Chard, and Olivo, fails to suggest a video software/hardware architecture wherein the disabling of segments of the program material does not produce dead segments.

The patent to Vogel, U.S. Pat. No. 4,930,160, addresses the resulting dead segments in the transmission by providing a facility for displaying alternative material during the dead segments. The alternative material selected during censorship periods can originate from a remote source, for example, another television broadcast, or locally, for example, from a video disc or tape player. However, Vogel and the prior art known to the applicant, do not provide a system that creates, from a single source, an automatically edited, seamlessly continuous program in which edited out segments are replaced with other parts of the same program responsive to a viewer's preestablished video content preferences.

The patent to Bohrman, U.S. Pat. No. 5,109,482, discloses and is titled "Interactive Video Control System for Displaying User-Selectable Clips". In Bohrman, it is the viewer that, with precise knowledge of the contents of the video segments of a program, interactively creates an arrangement of the viewer selected segments. In other words the segments are not automatically selected and arranged responsive to a viewer's preestablished content preferences. Additionally, Bohrman fails to address the problems associated with the laser disc player's average access times.

A number of other interactive systems in the prior art provide viewers the means to participate, and thereby affect, the program's story lines or plot. The patent to Best, U.S. Pat. No. 4,569,026, discloses a video entertainment system where human viewers conduct simulated voice conversations with screen actors or cartoon characters in a branching story game shown on a television screen. As opposed to passive systems, the essence of interactive video systems is a viewer's participation. In interactive systems, at frequent points, the system's continued operation is dependent on the viewer's response.

In electronic games, of which Sega's CD ROM System for Genesis is an example, the access time of approximately one second results in noticeable pauses in the action, the effect of which is also mitigated by the interactive nature of the software. As a result of their interactivity, these systems can accept significantly slow random access times.

Further, as electronic games have been principally directed at children, or contain primitive subject matter, they have not dealt with issues raised by the more complex adult fortes of expression inherent in contemporary motion picture films. While electronic games provide setup editing capabilities (selection of: level of difficulty, character, weapons, etc.), they do not provide censoring editing capabilities. This is clearly evidenced in the discussion, marketing, and development of video games dealing with material generally deemed not suitable for children. Given the random access capability of CD-based systems, it is surprising that when dealing with adult subject matter, the inherent limitations of conventional films and the MPAA's rating system have been adopted by forthcoming CD based video games.

Thus the prior art known to the applicant has failed to show an integrated software and hardware architecture that provides for the automated selective retrieval of non-sequentially stored video segments of a program, from a single program source, responsive to a viewer's preestablished viewing preferences, and the transmission of the selected segments as a seamless video program.

SUMMARY OF THE INVENTION

These and other shortcomings of the prior art are overcome by the various features of the present invention which are directed to a seamless transmission of non-sequential video segments. For purposes of the present invention, various terms or nomenclature used in the art are defined as follows:

The term "viewer" as used herein is meant to include and be interchangeable with the words "player"(when referring to a person), subscriber, and "user". That is, the term "viewer" ought to be understood in the general sense of a person passively viewing a video, interactively playing a video game, retrieving video from a video provider, and/or actively using multi-media.

The terms "video" and "video program" are interchangeable and refer to any video image regardless of the source, motion, or technology implemented. A "video" comprises images found in full motion picture programs and films, in interactive electronic games, and in video produced by multi-media systems. Unless otherwise qualified to mean a computer software program, the term "program" is interchangeable and may be replaced with the word "video". While a particular feature may be detailed with respect to a specified viewing, gaming, or computing application, it is intended herein to apply the teachings of the present invention broadly and harmoniously across the different classes of applications that generate a video output.

The terms "variable content program" and "variable content game" refer to a specific video program characterized by a greater variety of possible logical content sequences that result from the additional segments provided for that purpose. The term "content" referring principally to the form of expression rather than the story-line. Where initially produced as a variable content program, the video utilizes parallel, transitional, and overlapping segments to provide viewing of a program's story-line/interactive action at different levels of forms of expression.

The term "video content preferences" refers to a viewer's preferences as to the "content" of a video. "Video content preferences", specifically and principally, although not exclusively, refers to a viewer's preestablished and clearly defined preferences as to the manner or form (e.g. explicitness) in which a story/game is presented, and the absence of undesirable matter (e.g. profanity) in the story/game. In the broadest sense the term "video content preferences" further includes "video programming preferences", which refers exclusively to a viewer's preferences as to specific programs/games (e.g Sega's "Sherlock Holmes Consulting Detective"), types of programs/games (e.g. interactive video detective games), or broad subject matter (e.g. mysteries). In contrast to the prior art "video-on-demand" systems which are responsive to a viewer's "video programming preferences"; a more inclusive "content-on-demand" system as per the teachings of the present invention is responsive to a viewer's "video content preferences".

The term "seamless" is intended in the sense that the transmission of sequential and non-sequential frames is undiscernible to the eye, and not in the sense of the natural video seams that result in the intended changes from one scene lo another, from one camera angle to the other, or from one gaming sequence to the other. In a seamless transmission of a variable content motion picture a constant video frame transmission rate is maintained, whether the frames are sequential or non-sequential.

The terms "B-ISDN", specifically referring to a broadband integrated services digital network, and "fiber optic", specifically referring to a network comprising fiber optic cable, refer to any "communications" means, private or public, capable of transmitting video from a remote video source to a viewer. In the broadest sense these terms further comprise satellite communications.

Where not clearly and unambiguously inconsistent with the context, these and other terms defined herein are to be understood in the broadest possible sense that is consistent with the definitions.

Accordingly, in view of the shortcomings of the prior art, it is an object of the present invention to provide a device comprising integrated random access video technologies and video software architectures that furnishes a viewer the automated selective retrieval of non-sequentially stored, parallel, transitional, and overlapping video segments from a single variable content program source, responsive to the viewer's preestablished video content preferences, and transmits the selected segments as a logical, seamless, and continuous video program.

It is another object of the invention to provide an interactive video game system comprising interactive video game software, variable content game, and a program segment map defining segments of the variable content game, furnishing a player of the interactive video game the automatic and logical selection of video segments responsive to the application of the player's video content preferences to the program segment map, and responsive to the logic of the interactive video game software.

It is yet another object of the present invention to provide a device that furnishes a previewer of a variable content program the capability for efficiently previewing automatically selected segments from the program, responsive to a viewer's preestablished preferences, to permit the previewer to indicate the inclusion of the selected segments in the program to be viewed by the viewer.

It is yet another object of the present invention that a viewer's video content preferences be stored in a portable memory device.

It is yet another object of the present invention to integrate fiber optic communications capabilities and read/write laser disc player capabilities within a single device to facilitate the downloading of a motion picture program from a source remote to the device.

It is yet other objects of the present invention to provide a variety of reading architectures that produce a seamless reading of sequential and non-sequential segments of a variable content program from a single video source.

Briefly these and other objects of the invention are accomplished by means of the random access video technologies detailed herein in combination with the teachings herein of a variable content program.

Unlike traditional film media that permits a program format with only a single sequence of frames, random access video technologies make possible a variable content program format that is characterized by a variety of possible logical sequences of video frames. In a variable content program the artist and program producer are challenged to create greater variety in the form of expression, and utilize parallel, transitional, and overlapping segments to provide viewing of a program at that level of expression, content, detail, and length, that is consistent with a variety of viewer preferences.

In contrast to interactive motion pictures, and full motion video games, in a variable content program it is principally the form of expression that is the object of alternate frame sequences, rather than the story-line. In a variable content program, each of the significant scenes and actions can be implicitly expressed, as found for example in a "PG" rated film, explicitly expressed, as found for example in an "R" rated film, and graphically expressed, as found for example in an "NC-17" rated film. As a result, unlike motion pictures which are packaged as a single sequence of frames, the U.S. version, the European version, the edited-for-TV version, the "XXX" version, and the version addressing each viewer's particular tastes and preferences, reside harmoniously within a single variable content motion picture.

The present invention details a number of random access video technologies that permit the retrieval, in a logical order, of the non-sequential segments that comprise a variable content program without altering the transmission of the required frames per second. An embodiment of a video system as per the present invention, permits the automatic transmission of the selected segments from a variable content program as a seamless continuous and harmonious video program responsive to a viewer's preestablished video content preferences. In a second embodiment, segments from an interactive video game are selected responsive to the logic of the interactive video game software and the player's video content preferences.

In a laser disc video system, random access video technologies principally comprising: multiple independently simultaneously controlled reading units, video buffer, and media architecture, permit, in one embodiment, during the read operation of one of the reading units of the video information contained in a program source, the repositioning of a second one of the reading units to the next required non-sequential position in the program source. The resulting synchronization effectively eliminating the gaps that would result from a single reading unit's average access time. That is, pauses, gaps, dead frames, and fill-ins, are eliminated in the playing of non-sequential video segment stored in a single program source.

To achieve the automated selection of only those segments consistent with a viewer's preestablished viewing preferences, each program segment in a variable content program is defined by and is associated with a content descriptive structure that provides specific and detailed information as to each segment's subject matter, level of detail, and form of expression. The segments definitions of a program further comprises a first and last frame identifier, and beginning frame identifiers of the next logical segments. The segments definitions are organized into a program segment map.

A random access device as per the present invention provides each viewer the opportunity to preestablish both any number of generalized, personalized video content preferences, and program/event specific content preferences, identifying the viewing preferences in each of a number of content categories. By analyzing a viewer's preestablished video content preferences as they relate to a program's segment map, the random access device gains the information to automatically exclude segments of the variable content program containing material which the viewer does not wish to view, and to transmit as a logical seamless transparently harmonious and continuous program only those sequential or non-sequential scenes or segments of the program whose content and form of expression are consistent with the viewer's preestablished video content preferences. The playing of a variable content program does not require that the viewer preview the contents of the segments of the program, and does not require viewer intervention during the viewing of the program.

Thus, the present invention while challenging the video program producer to fully exercise the freedom of expression, provides for the automated, seamless transmission of non-sequential video segments containing that level of artistic expression that is consistent with a viewer's preestablished video content preferences. The present invention, effectively harmonizing what are regarded in the popular press as conflicting objectives, provides an unparalleled opportunity for "freedom of expression and freedom from expression" (C).

These and other features, advantages, and objects of the present invention, are more easily recited and are apparent in the context of the detailed description of the invention, accompanying drawings, and appended claims, that follow.

BRIEF DESCRIPTION OF THE DRAWINGS

FIGS. 2A, 2B, 2C, and 2D, are illustrations of video segment descriptive structures as per the present invention;

DESCRIPTION OF THE PREFERRED EMBODIMENT

Figure 1:
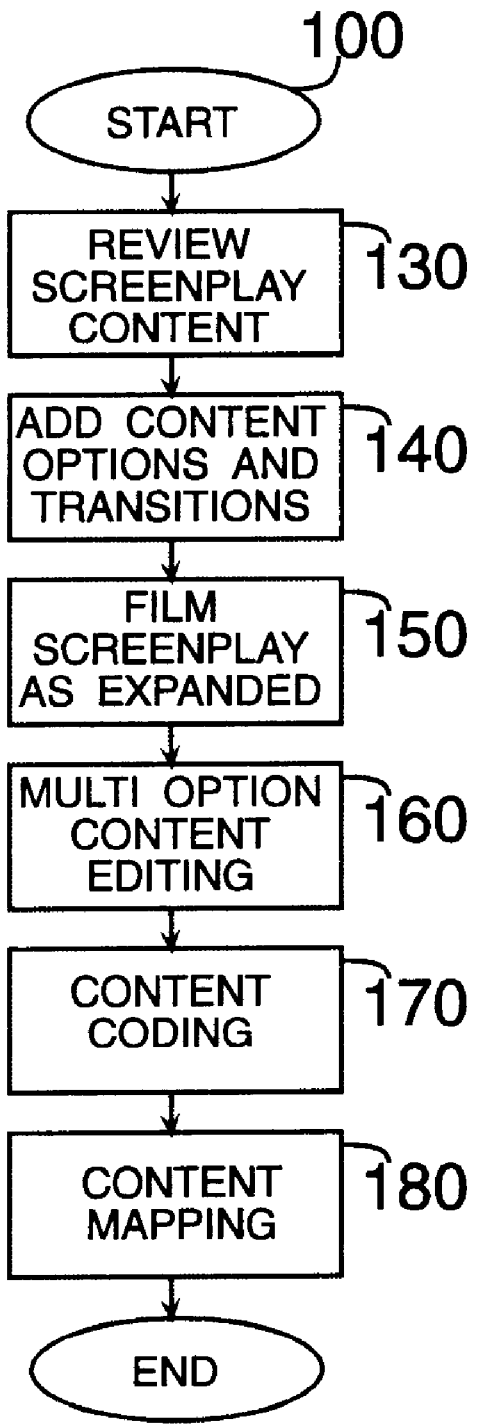
FIG. 1 is a flow chart summarizing the steps of producing a variable content program as per the present invention.

The steps in the production of a variable content program are summarized with respect to the simplified flow chart of FIG. 1. Each scene or fragment of a scene on a video script is reviewed 130 according to an appropriate segment descriptive structure, as for example detailed with respect to FIGS. 2A–D. A screenwriter now has the freedom to expand the scenes by adding parallel, overlapping, and transitional segments, to cover a wider descriptive range 140 without the concern for the limitations inherent in first generation program formats. A successful filming 150 of this variable content architecture is a function of the skill of director(s), actors, animators, programmers, etc. to provide for parallel and transitional segments with the required transparent harmony.

In contrast to the editing of first generation motion pictures that require producing a unique linear sequence of segments, editing of this program format requires a parallel, non-sequential, logical arrangement of segments 160. A segment assigned a category descriptor may be congruent in one or more frames with a segment assigned a different category descriptor. Where necessary, a video segment is associated with more than one audio segment, and corresponding separate voice and video category descriptors are provided. The editing of a variable content program is significantly distinguished from the editing of an interactive motion picture is that in the latter the editing is concerned with a branching story-line, while editing in the former is principally concerned with optional forms of expression of the same story-line.

The complexity of a variable content program/game is only limited by the requirements, desires, skill, and hardware/software available to the program editor. To that extent, it is intended that the editing functions, in particular, be assisted by integrated computerized editing resources. With respect to the computer assisted editing, the teachings of the patents to Bohrman, previously cited, and to Kroon et al., U.S. Pat. No. 4,449,198, are by reference incorporated herein. It should be appreciated that the art of program editing under this new format is intended to significantly transfer censorship, and time-constrained editing decision making from the producer/editor to the viewer.

As each segment is defined, the beginning frame and end frame in each of the relevant segments is identified, the segment content is assigned a category descriptor, and logical entry and exit references are assigned 170. The resulting segment definition is mapped 180 and the required user interface produced. The program segment map, any user interface routines particular to the program, and player control codes, if required, are provided with the information comprising the programs video and sound.

FIGS. 2A, 2B, and 2C illustrate examples of generalized descriptive structures that are utilized to review the contents of each segment contained in a given program, and to assign the appropriate segment content descriptors. Specifically, FIG. 2A illustrates a descriptive structure 210 implementing a descriptive scale 211 that mirrors the current rating system utilized by the MPAA (Motion Picture Association of America, Inc.). The MPAA's "Voluntary Movie Rating System" comprises the symbols "G", "PG", "PG-13", "R", and "NC-17" and the corresponding legends, which are trademarked/pending by the MPAA.

The descriptive structure, further includes, in this example, a number of categories 212 of conventional concern in the popular culture. Each number in the matrix 219 in the chart represents the particular descriptor for a given category that can be assigned to a specific scene or segment. For example, a scene of an old western style barroom brawl might be assigned a 130-4 (graphic violence). While the absence of an element is presumed, unless otherwise indicated, as an example, the absence of bloodshed is assigned a 135-1 (no bloodshed).

The contents of a segment are further coded on the basis of a number of other considerations. FIG. 2B is an example of an element descriptive structure 220 utilized to analyze the development 221 of a number of elements 222 such as character, location, time, degree of detail, and the level of expertise appropriate for the segment. In a similar manner, an individualized, tailored, and descriptive structure may be provided for any one category or group of categories. For example, FIG. 2C illustrates a descriptive structure 230 utilized to classify segments according to a level of inclusion 231. Such a structure is appropriate, for example, in coding a news report.

Additionally, or alternatively, a video segment descriptive structure, as shown in FIG. 2D, is implemented that incorporates the MPAA's movie rating system. Under this video segment generalized descriptive structure 240, segment definitions are assigned a descriptor (rating) 249 from a descriptive scale 241 incorporating the MPAA rating symbols 249, or any other available analogous rating system. Determination of each segment's rating symbol being similar to the manner in which the MPAA rating system is applied to a motion picture. While this rating scale 241 may be implemented in conjunction with categories, as detailed with respect to FIGS. 2A, and 2B, a simplified embodiment is not concerned with identifying the category, instead, the segment definition comprises frame information and a simple descriptor (rating).

It is noted that FIGS. 2A–2D are examples of an overall framework for segment analysis, the actual descriptive structures and level of complexity utilized may be highly tailored by the producer of a program to reflect the specific content of a program without being limited by the structures which will be widely accepted, constitute a standard, and found to be generally utilized in other works. Each program producer is offered the flexibility within the overall architecture of this descriptive structure to determine and include only those categories that are relevant to a particular program, and to add categories as the producer requires. Similarly, the producer is offered some flexibility in determining the labelling of the descriptive scale.

Meeting the objectives of being able to provide both a standardized set of descriptive structures that permits the automatic application of a viewer's preestablished preferences to a variety of programs, and provides the producer of the program the flexibility described above, are accomplished for example by assigning unique classification codes to each set of preestablished standardized categories, and by reserving a range of classification codes that are recognized by the system as requiring additional selection by the viewer.

Figure 3A:
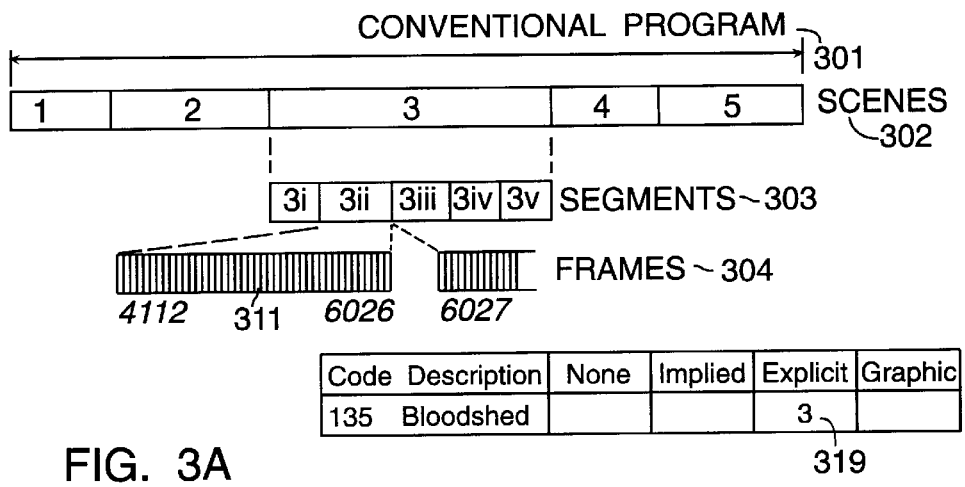
FIGS. 3A, 3B, 3C, are diagrams of three versions of a video segment and corresponding descriptive structures, each segment a variation of the other as per the present invention.

FIG. 3A illustrates an example of a conventional motion picture program in which the segments are arranged as a unique sequential arrangement of frames. In a variable content program adaptation of the conventional motion picture, the various scenes 302 of the program are, according to an evaluation of the contents of the scenes, divided into appropriate segments 303. Each segment is identified with a beginning and ending frame and comprises any number of frames 304. In this example, scene three is divided into four segments, in which segment 3*ii* 311 begins at frame 4112 and ends at frame 6026. The next segment, 3*iii*, begins at frame 6027. Segment 3*ii*, which in a conventional motion picture contributes to an "R" rating for the program, includes frames depicting explicit bloodshed. The content of segment 3*ii* 311 is indicated by the numeral 3 in the appropriate cell 319 of that segment's descriptive structure.

Figure 3B:
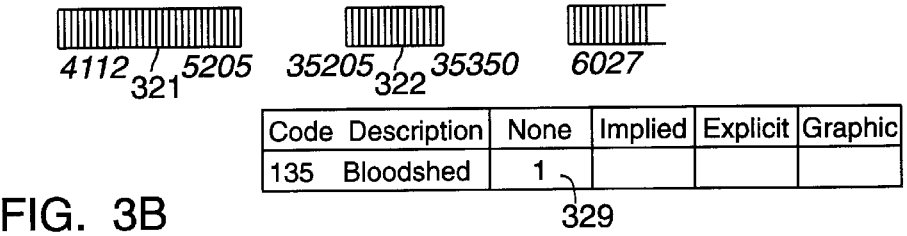

Referring now to FIG. 3B, to provide for the option of editing-out the explicit bloodshed in a variable content program, the program segment map includes an additional segment definition 321 beginning at frame 4112 and ending at frame 5205. The end of this segment 321 is linked to a new transitional segment 322 beginning at frame 35205 and ending at 35350, the end of which is linked to frame 6027. In this fashion, frames are omitted and added to provide a continuous transparent edited version of any segment. This frame sequence 321/322 is associated with the corresponding segment content descriptive structure 329 to indicate the absence of bloodshed. In all other respects the segments 321/322 are equivalent to the original segment 311. For first generation programs, the editing-out works in a like manner except that the transitional segment 322 is not available to make the seamless transmission from frame 5205 to 6027 transparent.

Figure 3C:
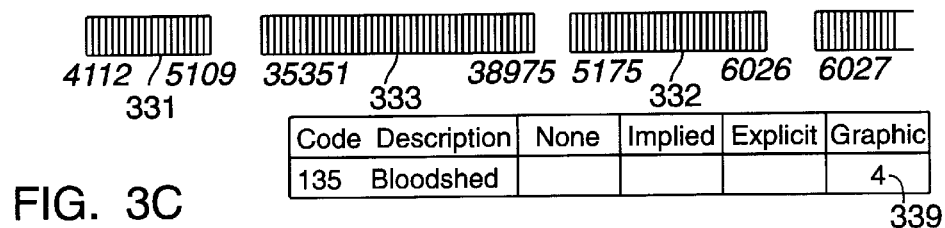

To provide for the option to include a graphic level of bloodshed, the program segment map includes an additional segment definition. Referring to FIG. 3C, in this case, only 66 frames of the "first" segment 311 are "ignored", and new segment definitions 331 and 332 are created, to accommodate the graphic bloodshed included in an additional segment 333 beginning at frame 35351 and ending at frame 38975. This frame sequence 331/333/332 is associated with an appropriate segment content descriptive structure 339. In this manner, parallel and transitional segments provide a descriptive selection mix ranging from a segment combination excluding bloodshed 321/322 to a segment combination including graphic bloodshed 331/333/332, as well as the segment combination including explicit bloodshed 311. As a result, the particular scene of which these segments are a part can be viewed at any of the three content levels for that category.

A scene can include subject matter of more than one category. In such cases, overlapping segments and transitional segments are provided to permit viewing of one subject matter at one descriptive level and viewing of another subject matter at another level.

Figure 3D:
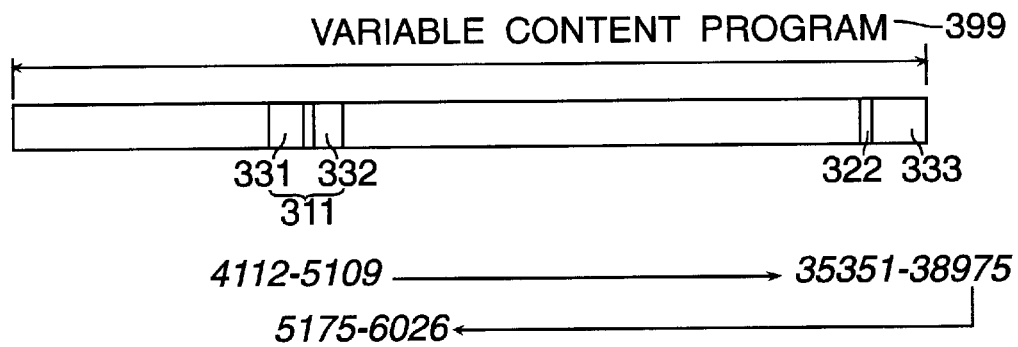
FIG. 3D is a diagram representation of a variable content program showing the non-sequential arrangement of segments as per the present invention.

Referring now to FIG. 3D, the location of the net additional frames that result from the additional segments 322/333 cause some frames to be non-sequentially placed in the variable content program 399. Ignoring the frame numbers of segment 322, FIG. 3D is illustrated to diagrammatically emphasize the resulting sequential and non-sequential random-like arrangement of video segments in a variable content program. This is shown for example, in the segment combination 331/333/332, depicting explicit bloodshed and the corresponding non-sequential frame sequence.

The segments combinations shown comprising the segment definitions together with the corresponding descriptors comprise a program segment map. A program segment map causes, for example, the retrieval of the segment combination beginning at frames 4112–5109, followed by frames 353514–38975, and ending with frames 5175–6026 in response to the application of a viewer's program content preferences to the program segment map.

Figure 3E:
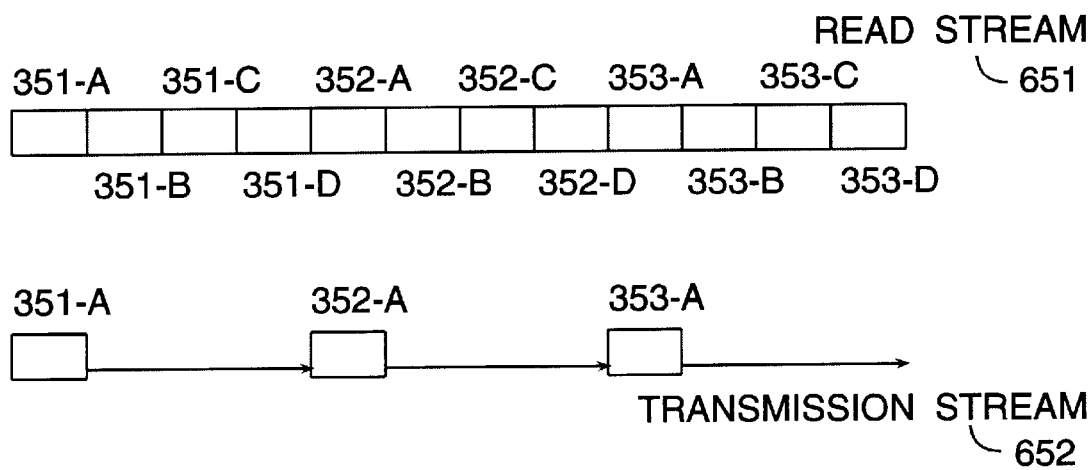
FIG. 3E is a diagram representation of a variable content program reading stream and transmission stream as per the present invention.

In an actual feature length variable content motion picture the significant additional segment/frames are arranged responsive to the particular random access hardware architecture implemented. For example, FIG. 3E, illustrates an arrangement in which the reading unit reading stream 341 comprises alternating frames from four separate segments and is read at an effective rate of 120 frames per second. The processing architecture selecting the desired segment from the read stream 341 to generate a transmission stream 342 of the desired frames 351A–353A at a rate of 30 frames per second. This and other architectures are detailed later on with respect to FIG. 6.

A system embodying the teachings of the variable content program provides each viewer the opportunity to define personalized video content preferences. The content preferences identifies each viewer's preferences in a range of video content categories. The architectures of a viewer's content preferences and that of the segment content descriptive structures are interrelated. As is detailed below, the preferences are established prior to transmission of the program to the receiver, so that during the transmission of the program viewer intervention is not required.

Figure 4:
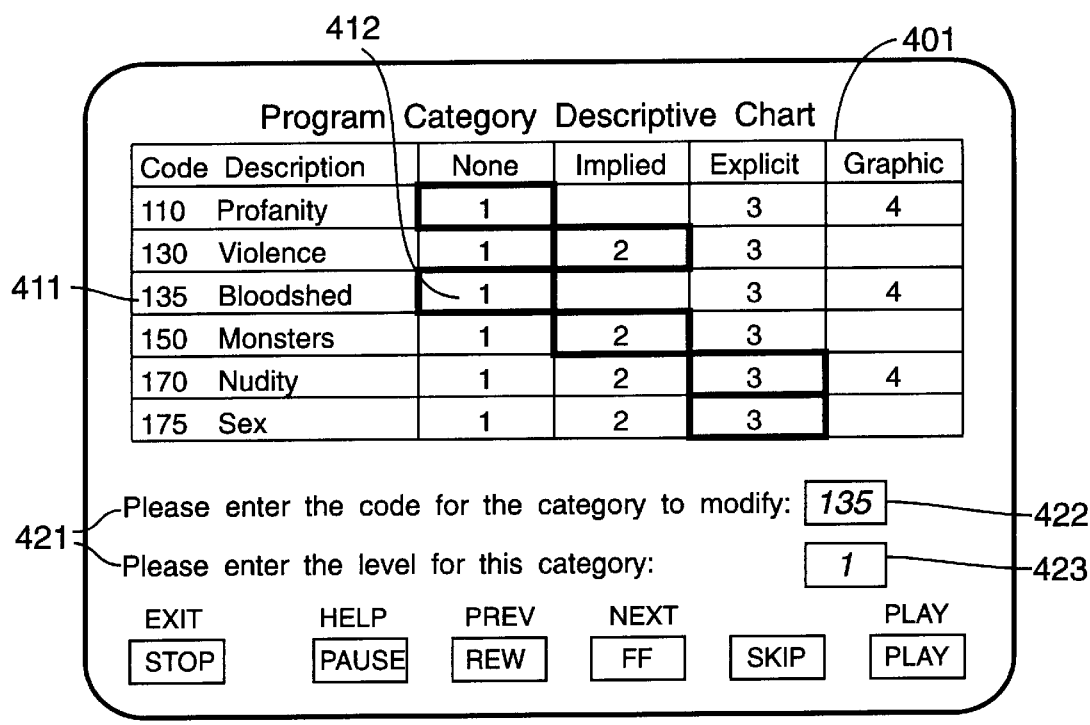
FIG. 4 is a sample video content preference selection screen as per the present invention.

FIG. 4 illustrates a program's categories descriptive chart 401 that merges the various descriptive structures of the segments of a program. For example, the category bloodshed 411 indicates that the program offers options to omit the viewing of bloodshed, or include explicit or graphic segments in the viewing of the program. In this example, depicted by bold boxes is the viewer selected level for each category. The viewer in this case has elected to omit bloodshed 412 in his/her viewing of the program. In this particular screen design, viewers indicate their selections by following the entry requests 421, and pressing the appropriate numeric keys on the player's remote control unit to indicate the category they wish to access 422 and the viewing level for the category 423.

In simplified terms, any segment with a descriptive level higher (abstract) than the viewer-selected level for a given category is not included in the program produced for the viewer. The segment selected for viewing (a descriptive level equal to or next lowest) provides the next segment beginning frame information, skipping over parallel segments of a lower rating than the viewed segment.

While the teaching above are detailed principally in terms of a variable content motion picture movie, clearly the teachings are applicable to any video program. Specifically, interactive video games utilizing full motion video segments can also benefit from providing the viewer/player of the game the option to preestablish video content preferences in addition to the gaming options which may be included in the video game software. As in a variable content program, in a interactive variable content video game, the video segments shown are consistent with the player's video content preferences.

Figure 5:
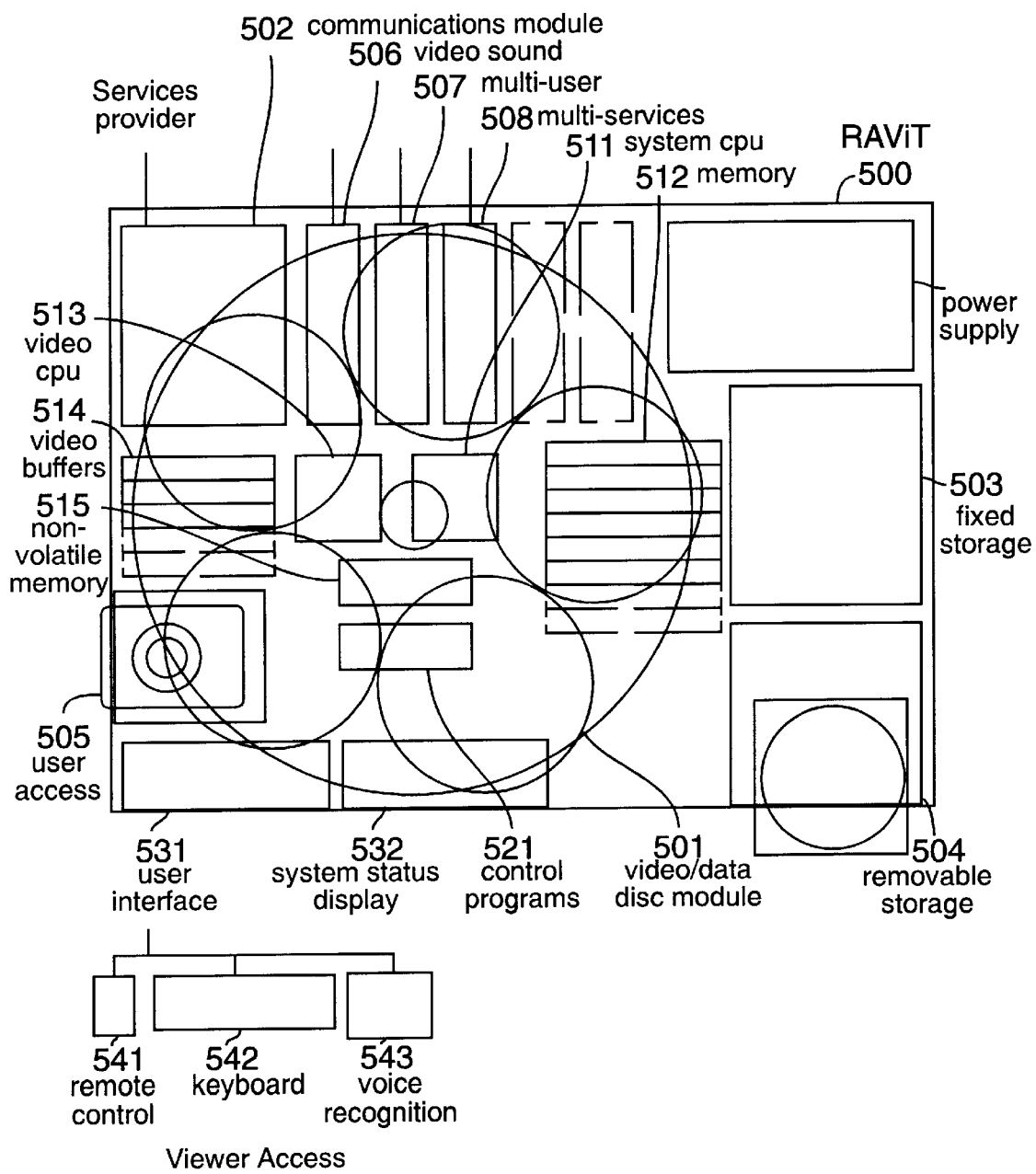
FIG. 5 is a schematic diagram of a random access video technology device comprising fiber optic communications and variable content laser disc capabilities as per the present invention.

The preferred hardware architecture of a video system that embodies the teachings of, and delivers the benefits of, the variable content program is referred to herein as a Random Access Video Technology system ("RAViT") (C), and is specifically detailed with respect to FIG. 5. Referring to FIG. 5 a preferred configuration of a RAViT 500 device principally comprises the following primary modules and sub-systems: i) random access laser video/data disc module 501; ii) communications module 502; iii) fixed memory sub-system 503; iv) removable memory sub-system 504; v) compact portable memory sub-system 505; vi) external video/sound input/output support module 506; vii) multi-user modules 507; and viii) multi-services modules 508.

A fixed memory sub-system 503 refers to any non-volatile memory storage device principally utilized to randomly read/write and store significant quantities of information. An example of a present fixed memory storage sub-system is a personal computer hard disk drive, currently generally installed in 80–240 MB capacities.

A removable memory sub-system 504 refers to any non-volatile memory storage device principally utilized to transport information to and from two similarly equipped devices. Examples of present removable memory storage sub-systems are personal computer floppy disk drives 1.2 MB, micro floppy disk drives 1.4/2.8 MB, backup tape drives 60–240 MB, and removable hard disks 20–80 MB. The random access laser disc module 501 is another example of a removable memory storage sub-system.

A compact portable memory sub-system 505 is principally distinguished from a removable memory sub-systems 504 in the size of the media and the greater variety of memory storage technologies that are generally implemented. Nonetheless, some of the removable memory storage media such as for example, the micro floppy disk, are also considered compact portable memory media. With present technology, compact portable memory media is available in dimensions similar to conventional credit cards. Examples of compact portable memory are: laser read/write cards, in which at least one surface of the card permits a laser to read/write information; electronic cards, in which the information is stored in electronic components; and magnetic cards embodying magnetic storage technology, of which a credit card is an example. Other examples of compact portable media are electronic cartridges commonly utilized in electronic video games systems.

Clearly, a variety of memory devices are available utilizing technologies and combinations of technologies to suit particular performance requirements. The above classifications of the memory devices are directed at bringing attention to functional capabilities of RAViT rather than to a particular technology. The classifications are not intended to restrict a device to a particular classification, limit the selection of devices which may be implemented, or to limit the function of the particular device implemented.

From a marketing standpoint, it is also preferred that RAViT additionally "play" other laser media, such as for example current laser discs, CDs, CDGs, photo CDs, and interactive programs and games, in a conventional manner. This being diagrammatically shown in FIG. 5 as the five circles inside the representation of the laser disc unit 501. In this context, it is also noted that the multimedia capabilities in RAViT in combination with its ability to extract video/sound/data from these sources offers the user sophisticated CD-ROM like capabilities and interactive full motion video gaming capabilities. As to the latter, RAViT's hardware configuration detailed herein is significantly more capable than interactive CD-based video games such as for example Sega's CD ROM System for Genesis.

In a preferred embodiment, RAViT is a fully integrated viewing/gaming/computing video system. To that extent and given the other teachings that follow herein, RAViT's laser disc module will operate at the required rotational rate to accommodate differences in software rpm requirements. This being analogous to the different available speeds in a record player.

The external video/sound input/output support module 506 supports video/sound/data transmission to the primary video display system comprising for example a monitor/television, stereo system, and keyboard/voice recognition-response, Additionally, the input/output module supports video/sound input from local sources such as for example VCR's, video cameras, and videophones. The construction of the external support module follows the conventional practices of consumer electronic products as for example: laser disc players, VCRs, and personal computers.

Multi-user modules 507 principally support separate controlled independent access by other users of RAViT's processing, video, and communications resources. A multi-user operating system such as for example a version of Unix or Windows NT, manage the multi-user environment. The construction of multi-user modules following established networking technology and responsive to the operating system implemented.

Multi-services modules 508 provide a host of services, such as for example residential security, and appliance operation management. The operation of the module being principally a software application running under the multi-user operating system implemented. The construction of the particular multi-service module being responsive to the particular application. Example of a primitive multi-service module is a fax/modem pc card.

RAViT further comprises computing elements and video processing elements readily found in multimedia devices and video electronic systems such as for example and not limitation: i) microprocessor 511; ii) memory units 512; iii) video processor 513; and iv) video buffers 514.

RAViT's user control interface 531 includes communications to the buttons and keys located on the cabinet of the device, and to the associated control devices 541-2-3. The keys, buttons, and switches, conventionally found in consumer electronic devices and deemed advantageous to the operation of RAViT are implemented. These controls are further augmented by the following keys/functions: segment skipping control, preferences control, segment mapping control, and system menu control. The user control interface 531 additionally supports infrared remote control units 541, as for example infrared numeric control pad, and infrared keyboard; wire connected control units 542, as for example cable connected computer keyboards, mouses, and game controllers; and voice recognition units 543.

The keyboard, as in a personal computer implementation, facilitates system setup, keyword retrieval, and system functions requiring the entry of alpha characters. Since a preferred configuration of RAViT comprises significant multimedia capabilities, a keyboard is advantageous. A keyboard connector used to connect a standard AT keyboard or a dedicated keyboard is supplied. Alternatively, an infrared-based keyboard is implemented. Further, given the computing and storage capabilities of RAViT, a voice response sub-system option accommodating minimally the few commands, such as play, stop, mute, sound, skip, required to control the basic operation of the laser disc module can additionally be provided.

Implemented in RAViT is a digital system status display sub-system 532, which provides visual feedback and system status information.

RAViT's control programs that manage RAViT's resources, and the retrieval and processing of data and video information, reside in dedicated chips 521. Alternatively, the control programs are stored in mass memory devices 503 from installed software, in removable memory media 504, or in a compact portable memory device 505.

A variable content program not only comprises variable content video/sound information, but also comprises a corresponding program segment map, user interfaces, program routines, and system control codes. In an interactive variable content video game, the video game software also comprises a variable content program. The terms "program segment map" and the term "data", where not inconsistent with the context, are to be understood to comprise the program segment map, user interfaces, program routines, system control codes, and gaming software (where applicable). Wherever the terms "variable content program" are found, and the context permits, they are to be understood to comprise all the video/sound and "program segment map" elements.

In a preferred laser disc implementation, the entire variable content program (video/sound and program segment map) is provided in a video/data disc in a format similar to that required by the video images contained in the disc. Alternatively, the data is provided in the video/data disc in a different format from that of the video format, such as for example in digital photomagnetic or magnetic formats. In this respect the teachings of the patent to Smith, U.S. Pat. No. 4,872,151, are by reference herein incorporated. In a second alternative, the data is separately provided by a removable memory media 504, a compact portable memory device 505, or downloaded by means of the communications interface 502.

A RAViT simply configured and comprising a laser disc module 501 and for example a micro floppy disk drive 504 provides editing out benefits for the existing library of motion picture laser discs. In this configuration, the micro floppy disk provides the program segment map, user interface and other control programs particular to the motion picture, and stores a viewer's video content preferences. While the resulting program suffers, as does edited-for-television programs, from the lack of transitional, parallel, and overlapping segments, this technique provides an immediate library of full motion pictures to which the teachings of the present invention is applied.

Upon a playing of a program, the control program causes the reading of the program's identifier from the program source 501, searches the mass memory fixed storage device 503 for a corresponding viewer preferences, or applicable generic preferences, and upon viewer confirmation applies the stored viewer preferences to the program segment map.

With respect to control programs, scheduling routines, viewer preferences, program segment map, and other principally software elements, it is noted that these may be separately or jointly stored in any one of RAViT's various firmware/hardware memory devices. For example, the viewer preferences are stored in non-volatile resident memory 515, in the memory of the fixed or removable memory sub-system 503/504, a user's optical read/write access card or electronic memory card 505, or from the respective read/write video/data laser disc 501. In an interactive video game application, data in general, and game software in particular, for example, may be downloaded to the hard disk, reserving subsequent access of the laser disc for video/sound retrieval.

Generally, the control programs 521 generate a segment table reflecting the application of the viewer's preferences to the video program's content map. The segment table provides the control program's segment scheduling routines the information to cause the automated logical selection of sequential and non-sequential segments of the video program responsive to program segment map, the viewer's preferences, and the logic of the gaming software where applicable. The processing of the control programs being principally a function of the system cpu 511 and system RAM 512.

RAViT's video random access retrieval architecture principally comprising the video/data laser disc module 501, video cpu 513, video buffers 514 and processing capabilities, provides for the retrieval and transmission of selected sequential and non-sequential video segments stored in the disc. In terms of the integration of laser disc and processing capabilities and the retrieval of non-sequential video frames, the teachings of the patent to Blanton et al, U.S. Pat. No. 4,873,585, which details a system comprising a video disc player for storing and retrieving video frames, and a control computer for accessing particular sequences of stored frames on the video disc, are by reference incorporated herein, and are relied upon to detail the core operation and construction of a laser-based random access system. With respect to laser read/write units an read/write laser discs, the prior art teachings of laser disc players, such as for example Pioneer's Rewritable Videodisc Recorder VDR-V1000, and the teachings of the patent to Matsubayashi, U.S. Pat. No. 5,132,953, are by reference incorporated herein.

RAViT's laser disc module 501 comprises laser disc technology distinguished principally in the cooperative operation, responsive to the instructions of the segment scheduler, of the multiple read/write laser units to produce a continuous transmission of non-sequential video segments. In a laser-based random access multiple read/write architecture, each read/write unit assembly and operation is principally equivalent to corresponding laser-based assemblies found in the prior art, in which a laser beam reads and reproduces memory signals from a disc.

Figure 6:
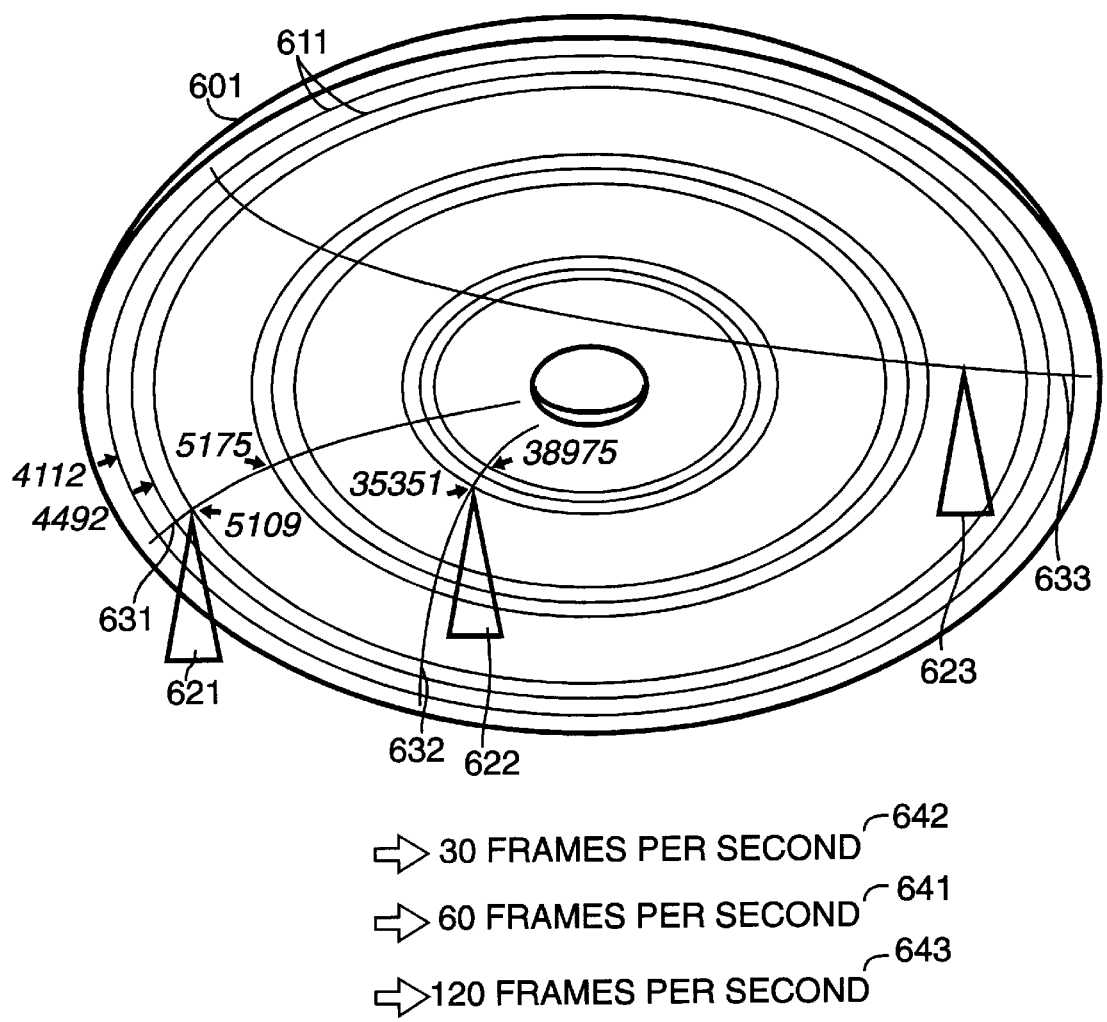
FIG. 6 is a schematic detail of a laser disc module's multiple reading units architecture as per the present invention.

Referring now to FIG. 6, the principal elements of a laser-based random access multiple read/write units architecture as per the present invention are illustrated. FIG. 6 shows a laser disc 601 having therein, in a laser readable format, sufficient recording area 611 to store a variable content program. The recording area 611 of the laser disc 601 is shown as substantially concentric tracks lying in a single plane. Alternatively, the recording area comprises a multitude of quasi-concentric tracks forming one or multiple spiral tracks. Additionally, tracks can be provided in one or more planes on each side of the laser disc, as well as on both sides of the disc.

Referring now to FIG. 6 in conjunction with FIGS. 3C and 3D, in a preferred embodiment of reading non-sequential video segments from a single video source, a first reading unit 621 is directed by the segment scheduler to retrieve video information corresponding to the desired frames 4112–5109 of a first, or current, video segment from a video source. Concurrently with the first reading unit 621 reading the information from the first segment, a second reading unit 622 is positioned, according to the program segment map and the segment scheduler, to preread within one revolution of the disc beginning frame information of a next non-sequential segment from the same video source.

In this example, the next non-sequential segment begins at frame 35351. Concurrently with the first reading unit reading 621 the current segment, the second reading unit 622 is caused to preread into a video buffer (514 FIG. 5) that portion of the next non-sequential segment beginning at frame 35351 necessary to provide a seamless transition from the first reading unit reading of the current segment ending at frame 5109 to the second reading unit reading of the next non-sequential segment beginning at frame 35351. The video buffer, thus containing the segment information necessary to provide a synchronized, seamless transition from the first segment to the second segment without any gaps in the transmission of the retrieved video segments as a continuous video program.

Concurrently with the second reading unit 622 reading the next non-sequential segment, now a current segment, the first reading unit 621 is repositioned to begin prereading of a next non-sequential segment beginning at frame 5175. By the time the second reading unit 622 completes reading the current segment at frame 38975, the first reading unit 621 has preread frame 5175. The process, analogous to a relay race, repeating itself until the last desired segment has been read.

In an interactive video game application, a multiple reading unit architecture is advantageously utilized to additionally provide faster video responses to the user/player's actions. Briefly, while a first reading unit 621 is reading a first video segment, frames 4112–5109, a second reading unit 622 is positioned to read a second segment beginning at frame 35351. The positioning of said second unit 622 being responsive to the option being presented to the player during the reading of the first segment which may require reading the second segment rather than continuing reading the first segment or reading the next sequential segment. Alternatively, the second reading unit provides overlay images in synchronization with the images retrieved by the first reading unit.

Each reading units's movement over the disc surface is over a designated radial segment such that the movement of each reading unit over the recorded radius of the disc is not impaired by the movement of a different reading unit. In this fashion, the movement of the first reading unit 621 over its radial segment 631 does not intersect the movement of the second reading unit 622 over its radial segment 632.

It is noted that the reading unit's travel need not be limited to the radial segments. A positioning system providing for the positioning of the reading unit at any point over the recording media, provides the reading unit the potential to precisely intercept the beginning of a segment/frame at a precisely defined moment. This being represented in FIG. 6 as the juncture of a radial segment 631 and the beginning of frame 5175. In this fashion the requirement of prereading into a video buffer can be reduced if not eliminated.

FIG. 6 also shows a third reading unit 623. While a simple variable content motion picture application does not require more than two reading units, the third reading unit 623 is illustrated principally to emphasize that a multiple-read architecture is not limited to two reading units 621–622, and is available for more demanding interactive variable content game applications. Further, as illustrated, a reading unit's movements over the recorded surface need not be confined to a particular quadrant, side of the surface, or radius of the surface. In the illustration the third reading unit's 623 movement over the recorded surface is permitted over the recorded diameter 633 of the surface.

Additionally or alternatively, the information is recorded on the laser disc in a manner that, either through placement or duplication of frames, anticipates the desired and possible position of a reading unit. In this case, even if the movement of the reading units are confined to radial segments, the requirement of a video buffer is for this purpose eliminated. This also being represented in FIG. 6 as the various junctures of the radial segments and the beginning of the frames.

Specifically, in this architecture, concurrently with a first reading unit 621 reading a current segment from a single video source, a second reading unit 622 is positioned to be able to intercept and read the beginning of a next non-sequential segment, in this example frame 35351, at that instant that the first reading unit 622 completes reading the current segment at the end of frame 5109. At that the first reading unit 621 completes reading frame 5109, the second reading unit begins reading frame 35351, thereby in combination with the first reading unit causing a seamless transition from the reading of the current segment to reading of the next non-sequential segment.

In the next stage, concurrently with the second reading unit 622 reading the beginning of the next non-sequential segment at frame 35351, now a current segment, repositioning the first reading unit 621 to be able to intercept and read the beginning of a next non-sequential segment, frame 5175 at that instant that the second reading unit completes reading the current segment at frame 38975. The process continuing until all the required segments are read.

Still additionally, or alternatively, the rotational speed of the disc platter is set sufficiently high to permit the reading unit to read into buffers sufficient video information to provide the same reading unit sufficient time for repositioning and begin reading the next non-sequential segment before the video information in the buffer is exhausted. This would in certain applications eliminate the need for multiple reading units.

Specifically, in the reading of non-sequential video segments from a single video source, a single video source 601 is caused to rotate at a sufficiently high rate 641, in this example 60 frames per second or 3,600 rpm 641, i.e twice the rate of 30 frame per second 642, to permit a reading unit 621 to both read and preread an amount of a current segment (frames 4412–5109) into a video buffer sufficient for the reading unit 621 to be repositioned to read the beginning of a next non-sequential segment, frame 35351, before the preread amount in said video buffer is exhausted. In this example, prereading frames 4498–5109 provides the reading unit 621 sufficient time to be repositioned to read a next non-sequential segment, frames 35351–38975. Concurrently with the repositioning of the reading unit, the video buffer provides the last preread frames 4498–5109 to cause a seamless transition from the reading of the current segment, frames 4112–5109, to the reading of the next non-sequential segment, frames 35351–38975. The process continuing until all the required segments are read.

In this architecture, the reading unit prereads into the buffer only in advance of a next non-sequential segment, or continually prereads into the video buffer as the video information in the buffer is depleted.

A variation of this technique particularly applicable to interactive video game applications is detailed with respect to FIG. 3E. In this example, previously summarized, a read stream comprises alternating frames from a number of different video segments. The number of different video segments resulting from the attainable effective transfer rates of the system. For example if the video application requires a transfer rate of 30 frames per second, and video compression techniques, rotational speed, and/or reading capability of the system can achieve an effective transfer rate of 120 frames per second, than four different video segments can be read "concurrently" by a single reading unit. In such an architecture, the frame arrangement comprises a reading stream 341 of alternating frames from four separate segments A–D and is read at an effective rate of 120 frames per second. The processing architecture selects the desired segment A,B,C, or D from the read stream 341 to generate a transmission stream 342, at a rate of 30 frames per second, of the desired frames 351A–353A, 351B–353B, 351C–353C, or 351D–353D.

To further detail, and with respect to FIG. 6, a single video source 601 is caused to rotate at a sufficiently high rate, for example 60 frames per second 641 or 120 frames per second 643 to permit a reading unit 621 to read at multiples of the 30 frames per second rate required to transmit a single one of a plurality of video segments (A–D). Referring once more to FIG. 3E, the frames being intermittently arranged as a reading stream 341 in the video source. As the reading unit is caused to read the reading stream 341; a video processor (513 FIG. 5) extracts from the reading stream 341 a transmission stream 342 representing a single one of the plurality of video segments.

In this fashion a single reading unit can provide instantaneous shifting among a number of different segments. In an interactive video game application, shifting among a number of different video segments can be instantaneously achieved in response to a players interaction with the game's software logic.

To enhance the simulation of each video stream, a windowing technique, such as shown in the previously cited patent to Blanton et al., in which only a portion of each frame is displayed, is applied to each frame in one or more of the video streams to enhance the simulation of movement within a multi-dimensional space and to provide composite images of greater complexity.

These and other variations in the particular number and arrangement of the reading units, video buffer, and frame arrangement configuration that is implemented in a RAViT is a function of the complexity of the video/data, and cost/performance constraints. It is also intended that the teachings of the various configurations shown herein and in the cited art may be combined responsive to the particular application. Clearly, with technology continuously achieving greater storage capacity in smaller, faster, and more cost effective storage devices, there is no apparent limitation to the complexity of the variable content program that can be commercially executed.

The description above has for simplicity been detailed with respect to a reading unit. It is to be understood that a reading unit herein comprises both reading and writing capabilities operationally independent of the operation of another read/write unit in the system's architecture. Additionally, a read/write unit need not be limited to a particular current architecture, enhancements to the construction of the reading unit itself, such as for example multiple tracking mirrors/beam splitters, are contemplated to produce faster access times and transfer rates. Further, the multiple read/write architecture detailed need not be limited to a laser disc system. In an alternate embodiment, a hard disk drive is modified as per the teachings above detailed to significantly increase transfer rates and lower average access times. Clearly, at present, in a hard disk embodiment the read/write units are magnetic read/write heads.

Generally, the viewing of a variable content program is intended to be hardware independent. That is, a variety of hardware, firmware, and software architectures are possible either locally or remotely accessible by the viewer that provide the benefits of a variable content program. In particular, a random access device's read/buffer architecture, modified as per the present invention, is intended to be implemented in a variety of mass memory devices. Embodiments of the read/buffer architecture detailed herein is not intended to be limited to any particular available recording medium and recording format technologies. The teachings of the present invention are applicable to a number of random access technologies such as, for example, and not limitation, fixed and removable magnetic, optical, or photomagnetic media, and digital or analog recording formats. Any combination of existing or forthcoming media, format, and compression memory technologies may advantageously incorporate the teachings herein detailed.

In general, parts, sub-assemblies, and components of a RAViT are of conventional characteristics and are freely substituted by like functioning elements and components. For example, and not limitation, while fiber optic-based communications are preferred, copper phone lines and coaxial cable-based communications are considered, albeit less capable nonetheless, functional equivalents. Additionally, a certain degree of redundancy of components is illustrated in FIG. 5 to schematically show and detail significant functions. Clearly, redundant components in general, and redundant electronic components in particular, are intended to be eliminated in a preferred embodiment. For example, in a number of configurations a removable memory sub-system and a compact memory sub-system are both required. In a general sense, one is the functional equivalent of the other. In a preferred embodiment, for example, a removable memory sub-system is eliminated, and the compact memory sub-system performs the functions that are associated with it. In general, where cost effective, components are designed to serve a combination of functions.

Further, the configuration of RAViT's various modules, components, and sub-systems, are intended to offer flexibility analogous to that found in a personal computer. Specifically with respect to the multi-user capabilities, a RAViT may be configured, for example, with more than one laser disc module. Whether inside the primary cabinet or in a mating or sister cabinet. Responsive to user friendliness, a more advanced wireless plug and play communications and power motherboard and cabinet design is preferred. The motherboard and cabinet permitting the replacement of, for example, the power supply just as easily as a battery is replaced in a portable personal computer. In a preferred embodiment of RAViT, every component and sub-system is replaced without resorting to screwdrivers and the need to unplug and plug communications and power cables.

While an embodiment of the present invention is detailed above with respect to a random access video laser disc device physically accessible by the viewer, variations are also possible. For example, the laser disc device need not be physically located near the television set. The patent to Fenwick et al. U.S. Pat. No. 4,947,244, by reference incorporated herein, discloses remote video distribution systems such as may be found in a hotel, wherein the viewer is provided remote controlled access to video resources. Fiber optic communications easily permit the required transfer rates between a device, or any alternative memory device, and a viewer's receiver/television.

As shown by the hardware configuration detailed with respect to FIG. 5, RAViT is equally adept at retrieving full motion video from a resident program storage device or remotely from a network-based service provider. A B-ISDN interface, an internal or external modem, or a dedicated communications line, such as for example a coaxial cable, provides RAViT communications capabilities with providers of programming and other on-line services. These other services comprising, for example, banking, security, shopping, instructional, and educational services.

With respect to video-on-demand, and video networks, the teachings of the patents to Monslow, U.S. Pat. No. 4,995,078, to Way, U.S. Pat. No. 4,891,694, and to Walter, U.S. Pat. No. 4,506,387, are by reference incorporated herein. These patents teach a variety of land line and fiber optic transmission of programs embodying varying degrees of viewer capabilities in the selection of programs. While the prior art does not teach transmission of a variable content program, a reading of said art will assist the reader interested in obtaining a more detailed disclosure of the hardware of such systems than is necessary to provide here.

Figure 7:
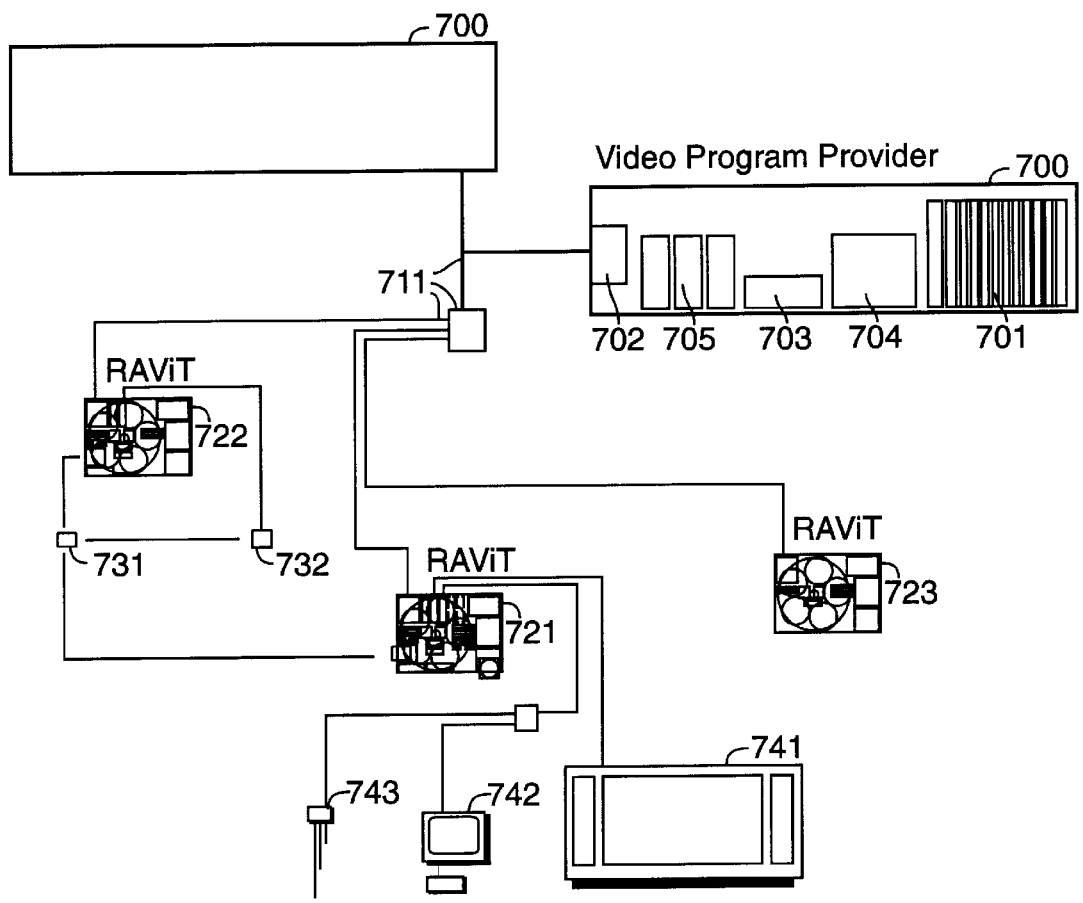
FIG. 7 is a schematic diagram a video program provider and subscriber network architecture as per the present invention.

FIG. 7 is a simplified schematic diagram a video program provider and subscriber network architecture as per the present invention. Participants in a B-ISDN 711, as per the present invention, comprise any number of video program providers 700 and any number of subscribers 721. As in a communications network, each participant is able to transfer and retrieve video/data transmissions from any other participant. Each participant obtaining a hardware configuration consistent with their desire and their financial means.

The particular configuration of each subscriber's video system's 721/722/723 storage, memory, processing, and communication capabilities is responsive to, but is not necessarily limited by, the minimum requirements of the particular service provider. A RAViT configuration, such as detailed with respect to FIG. 5, provides the required video program storage, processing, and communications architecture.

The video system of a participant who wishes to serve as a video program provider 700 is functionally equivalent to the RAViT device previously detailed, differing only in that the respective resources are appropriately scaled and modified to simultaneously access a variety of programs, and service a number of subscribers.

A video provider system 700 comprises: i) mass storage random access memory devices 701 for storing a plurality of variable content programs, and a plurality of program segment maps each defining segments of a corresponding video program; ii) communications linkages 702 to the B-ISDN for establishing communications with a plurality of participating subscriber video systems (RAViTs) 721/722/723; iii) processing hardware/software 703 for retrieving from participating subscriber video system a subscriber's video content preferences, and for automatically selecting, for each of the participating subscribers, variable content program/program segment map, and/or segments, from a programbase, comprising a plurality of variable content programs and corresponding program segment maps, responsive to the application of the corresponding one of the subscriber's video content preferences to the programbase; iv) random access devices 704 for retrieving for each participating subscriber the corresponding selected variable content programs and/or video segments; and v) transmission architecture 705 for transmitting, to each participating subscriber video system, the corresponding retrieved selections. Simply stated, an on-line variable content program provider provides each viewer content-on-demand.

In a preferred embodiment, in response to a subscriber 721 request of one or more variable content program(s) from a video provider 700, the entire variable content program including all the parallel, overlapping, and transitional segments is provided via the fiber optic network 711. Alternatively, the program is provided to the subscriber in the form that results from the execution of the viewer's video content preferences, i.e. a logical seamless sequence of only those segments that are consistent with the viewer preferences are transmitted in a real-time or a non real-time format over the network 711.

Where the subscriber 721 remains on-line with the video provider 700 during the transmission of the video and utilizes the hardware resources of the video provider, a RAViT comprising principally communications capabilities without significant local storage, processing, or memory, is adequate. In such an architecture the viewer preferences are retained by the video provider.

Retrieving video from a remote video provider permits subscribers to efficiently obtain from an extensive programbase a program to be viewed at the time of their choosing, over which they exercise complete control as to the subject matter, form of expression, and other elements comprising the program. Further, the resulting program need not comprise or result from a single variable content program in a programbase. A program may result from the automated selection of a variety of segments/programs from the programbase.

In a video provider, the implementation of the multiple read head architecture provides for the simultaneous retrieval of several versions of a program from a single program source to satisfy simultaneously the particular viewing requirements of several subscribers. A multiple read head architecture reduces, for example, the number of copies of a program that the on-line video provider requires. Alternatively, where cost effective, a variable content program may be entirely or partially stored in RAM.

It is also important to note that the novel combination of an external fiber optic based communications module and a multiple read/write units laser disc module, provides a RAViT configuration capable of efficiently downloading significant amounts of full motion video to be viewed, played with, or processed at the subscriber's leisure. In such a RAViT the downloading of, for example, a feature length motion picture, an interactive video game, or a series of lectures can be achieved with unprecedented speed.

The previously shown capacity to read/write the viewer preferences from/to a compact portable memory device 731 provides a viewer the means to automatically configure a RAViT that had not previously learned the viewer's video content preferences (dumb RAViT).

Referring once more to FIG. 7, in anticipation of the desire to efficiently utilize a dumb RAViT, a viewer instructs the smart RAViT 721 to download to a compact portable memory device 731 the desired viewer preferences and program request routines. To automatically configure and retrieve programming consistent with the preferences and program request routines, the viewer provides the prepared compact portable memory device 731 to the dumb RAViT 722, or to an accessory device 732 in communication with the dumb RAViT 722. The compact portable memory device 731 automatically configuring the dumb RAViT without necessarily downloading the viewer preferences other than to volatile memory. The operation being similar to moving a game cartridge from a first game player to a second game player.

In this context, programming request routines automate the retrieval of desired programming from a programming services provider 700 accessible to a RAViT 722. In this fashion, for example, a travelling executive can automatically configure each days new hotel room RAViT to retrieve videophone messages, the day's news in a format and for topics preestablished by the executive, followed by a menu of recently released films that the executive has not seen. The operation being analogous to inserting an access card in a hotel room door.

Alternatively, a similar automated configuration is performed by means of line-based external communications capabilities 711 available to both the dumb RAViT 722 and the smart RAViT 721.

As indicated with respect to FIG. 5, and represented in FIG. 7, multi-user and multi-services modules support separate controlled independent access by other users of RAViT's processing, video, and communications resources. In addition to the primary video display system 741 supported by RAViT 721, the multi-user module and multi-services module installed in this example support a separate monitor/keyboard 742 access to RAViT's 721 resources, and cooperatively supports the operation of a security system 743.

Before proceeding with a detailed description of the steps of utilizing a variable content video disc on RAViT, it is important to appreciate that in general following the initial setup of RAViT with a viewer preferences, a subsequent viewing of a variable content program conforming to the standard structure only requires the pressing of a play key. Following the pressing of the play key, RAViT automatically initiates playing of the video program without the necessity of any further viewer interaction or instructions. In other words, in a standardized descriptive structure architecture, once RAViT initially learns the viewer's preferences, it does not require any more of the viewer than, for example, a conventional laser disc player. Similarly in the playing of an interactive variable content game, once RAViT initially learns the viewer/player preferences, the gaming interaction proceeds transparently of the video editing functions. It is intended that a single viewer preferences serve both gaming and viewing applications. Optionally, the viewer may establish separate viewing preferences for each of the classes (e.g. gaming, viewing, computing) of video programs.

Figure 8A:
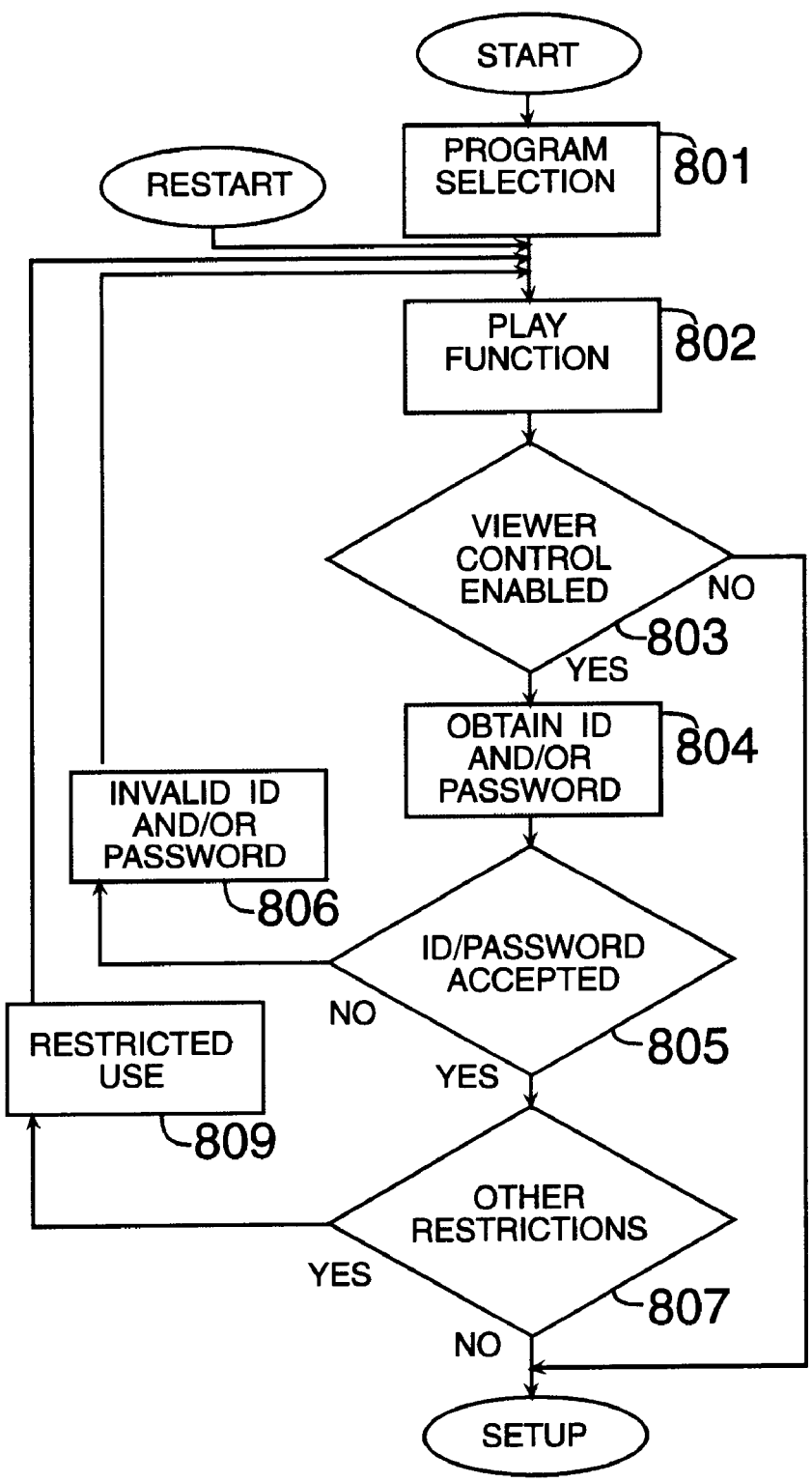
FIGS. 8A, 8B, and 8C, are flow charts summarizing the process of playing a variable content program as per the present invention.
Figure 8B:
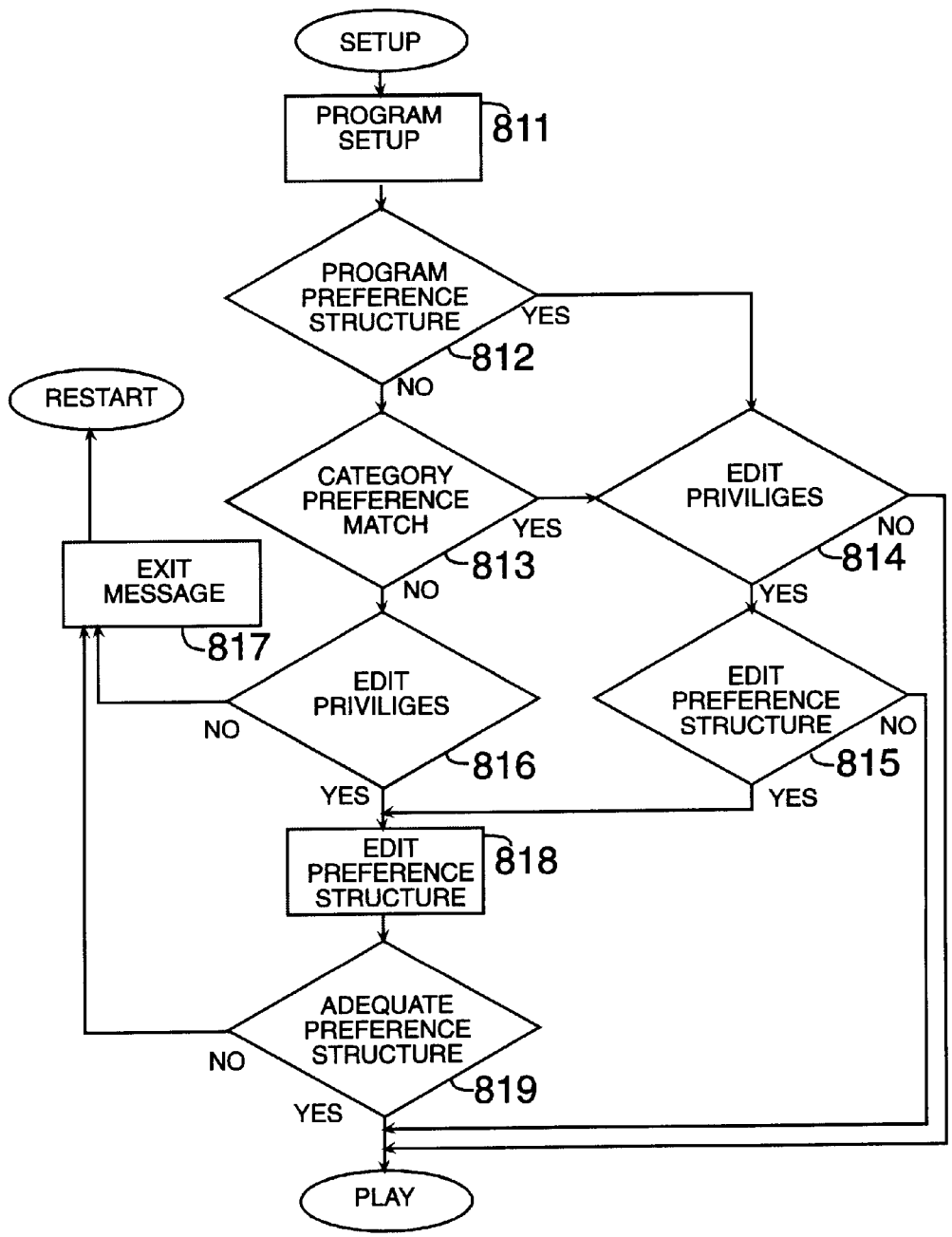
Figure 8C:
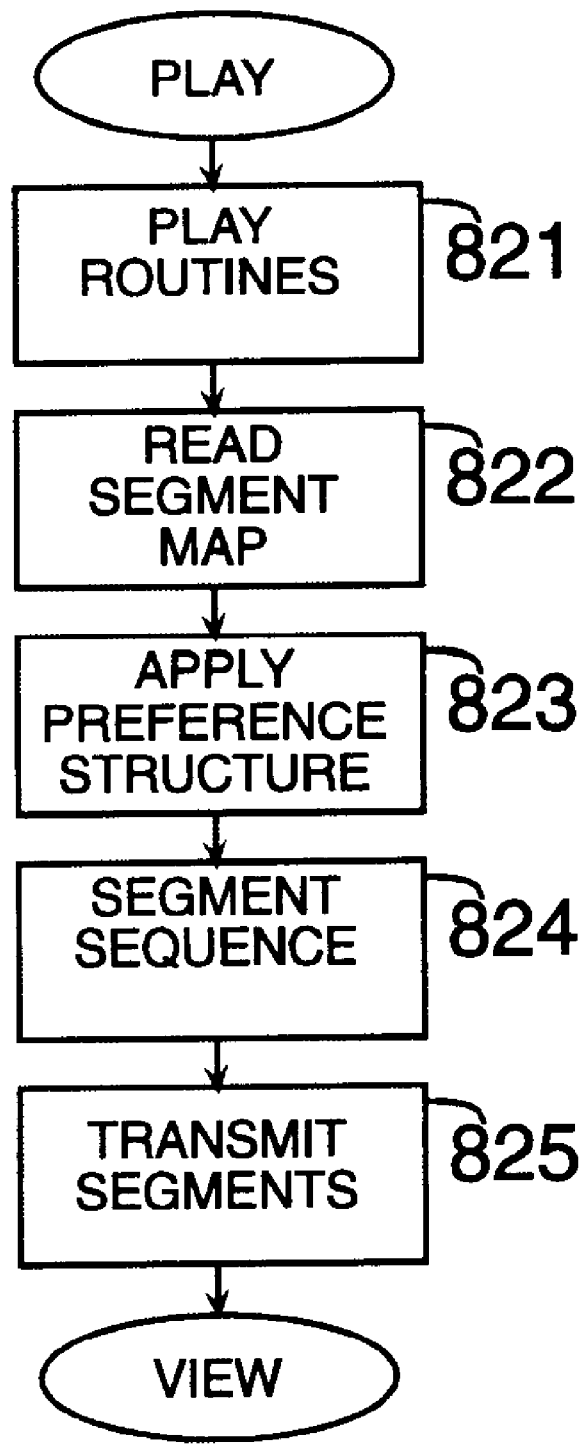

The steps comprising the method of viewing a variable content program on a RAViT are detailed with respect to the flow chart of FIGS. 8A, 8B, and 8C. Beginning at step 801, the viewer selects and retrieves the desired program consistent with the architecture of the particular RAViT hardware implementation. Upon selection of the play function 802, RAViT's software, firmware, and hardware processing capabilities ("processor") issue a command to read the viewer control setup to ascertain if viewer control is enabled 803. If enabled, RAViT's handshaking routines request viewer identification and, if required, a corresponding password 804. If the viewer identification and password are not found acceptable 805, the appropriate error message is transmitted to the television 806, and RAViT is returned to a state prior to the viewer play request 802.

If viewer identification and password are found acceptable 805, the processor checks for other restrictions to a user access 807. These additional restrictions include: time of day restrictions for the user, and/or accumulated usage during specified time frames. If restrictions are enabled that prevent usage 807, an appropriate error message 809 is transmitted to the television, and RAViT is returned to a state prior to the viewer play request 802. The user-permission capability enables a parent to have complete control over the use of RAViT, and provides for multiple individualized preferences.

If viewer control is not enabled 803, or if enabled, verification of the user 805 and verification of restrictions permit usage 807, program setup routines are initiated. Referring now to FIG. 8B, program setup routines 811 include reading, from the program source, program identification information. Based on the program identification information, which in addition to including a unique identification code also contains qualitative and classification program information, setup routines search to see if a corresponding viewer preferences/table for the identified program is available 812. Otherwise, the program category descriptive structures 813 are obtained from the program source to determine if a viewer preference is established for each of the program categories.

Once viewer preferences are established, the processor verifies set up status for editing privileges 814, to determine if the viewer has editing privileges for the class of programs to which the present program belongs and the categories included therein. The processor at this point transmits to the television a request for the viewer to indicate if the existing preferences are to be edited 815. If at step 814 edit privileges are not available for the viewer, the processor initiates normal play routines. If the viewer indicates that no editing privileges are to be exercised 815, normal play routines are initiated as well; otherwise, editing of the viewer preferences occurs at step 818.

The edited viewer preferences are interactively verified 819 until an adequate category preference match, as required by the program and the user is established, or the viewer selects to exit. Exiting at 819 returns RAViT to a state prior to the viewer play request 802.

If a viewer preferences for the login viewer for the selected program is not available 812, or at least one of the categories of the program is not contained in the viewer preferences 813, then the processor verifies if edit privileges are available for the viewer for the class of programs and the categories 816. If no edit privileges are available, an exit message 817 is transmitted to the television, and RAViT is returned to a state prior to the viewer play request 802. If edit privileges are available 816, then editing of the viewer preferences 818 is initiated.

Editing the viewer preferences 818 is supervised to insure that viewer modifications are consistent with the permissions established for that viewer. Individual viewer permissions are established broadly for any one or more classes of programs or categories, or specifically for any category. Once editing of the preferences is found complete 819, as required by the program category listing, play routines are initiated.

Referring now to FIG. 8C, following the enabling of the play routines 821, the program segment map is read 822 from the program segment map storage media or memory. As previously detailed, the program segment map defining the sequential and non-sequential segments of the selected program. At this point, RAViT's processing capabilities retrieve and apply the viewer's preferences, stored in a memory or a storage device, to the program segment map 823. The application of the viewer's preferences to the program segment map results in the automated logical selection of sequential and non-sequential segments of the selected video program 824 consistent with the viewer's video content preferences and the program segment map. Once the segments to be played and their sequence are determined 824, the random access retrieval and transmission capabilities of RAViT automatically retrieve the selected sequential and non-sequential video segments stored in the video program storage device, and transmit the video segments as a seamless, continuous video program 825.

In a interactive video game, the start and setup routines detailed with respect to FIGS. 8A, and 8B are integrated with each games setup routines.

As suggested previously, the capabilities of RAViT are particularly well suited to providing an editor (i.e. parent) complete control as to the video material to which a viewer/ player (i.e. child) is exposed. As indicated above, RAViT provides: user, time of day, amount of viewing controls; and individual preferences for each viewer/player or class of viewers/players. Additionally, supplementing or alternative routines are provided which are preferable in those instances where: i) segments cannot be rated according to standardized descriptive structures; ii) the utilization of a descriptive structure system is not desired; or iii) a simpler routine provides the desired functionality.

Specifically, the present invention permits an editor to automatically select segments of a video program previously identified in a program segment map as providing material which may not be suitable for a viewer; viewing the selected segments and determining their suitability for viewing by the viewer; automatically generating a listing of segments responsive to the segment suitability determination applied to the program segment map; automatically retrieving the listed segments; and automatically transmitting the retrieved segments as a continuous video program for said viewer. Segments not suitable for a viewer may be defined as segments providing content and form of expression which, in a conventional sense, is deserving of a rating other than a MPAA "G" rating.

Alternatively to, or in addition to the editing system based on the application of descriptive structures, a simplified editing system is based on the "flagging" of segments irrespective of the specific nature of the material which may not be suitable for a viewer. That is all segments containing material not suitable receives the same flag or code. The flagging of segments provides an efficient method of coding and retrieving the segments and indicating their inclusion/ exclusion in a program/game to be viewed/played.

Figure 9:
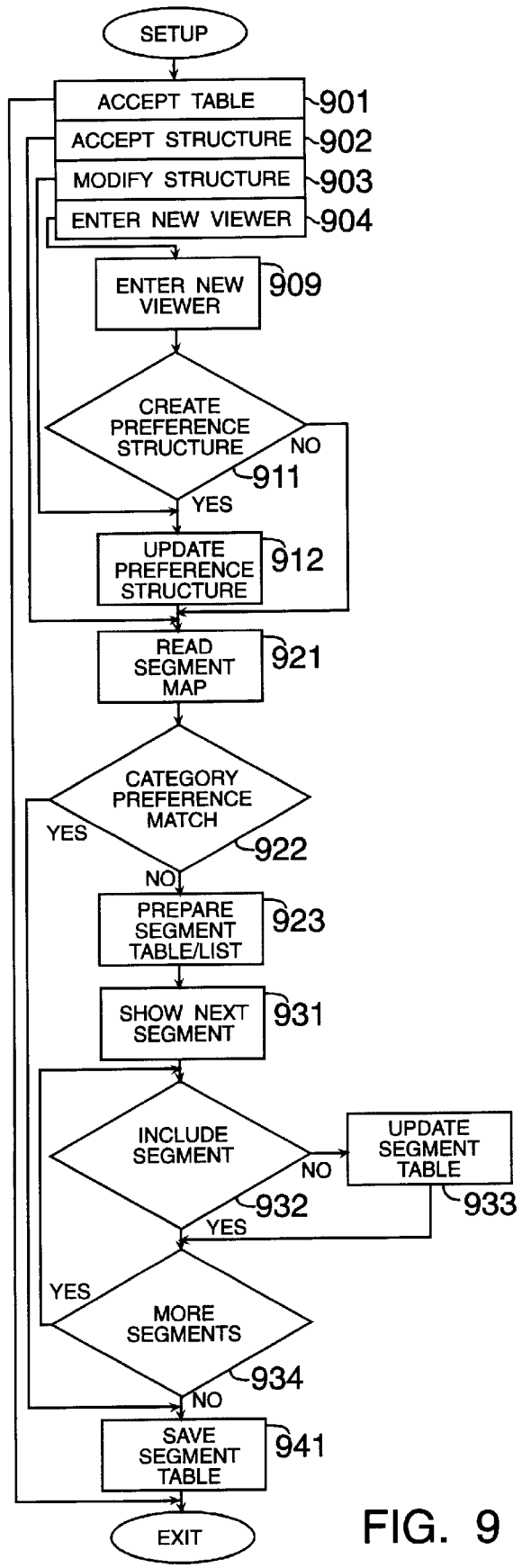
FIG. 9 is a flow chart summarizing the process of previewing flagged segments as per the present invention.

An example of the editing routines that provide for the efficient previewing of flagged segments are summarized with respect to FIG. 9. One of a number of RAViT setup routines present a listing of viewers over which the editor has editorial control. With respect to each viewer and the selected program, the listing indicates if a segment table is already available 901, and if viewer preferences are available 902 or not 903. Additionally the option to designate a new viewer 904 is made available to the editor.

If a corresponding table for the desired viewer is available 901 and the editor does not wish to make any changes, than selecting this option exits the routine, the operation of RAViT is then permitted as detailed previously. If a corresponding table for the selected viewer is not available, and the editor does not wish to create or update the viewer's preferences 902, than the routine proceeds by reading the program segment map 921. If the editor wishes to modify or create viewer preferences 903, than the routine proceeds with the appropriate routines 912. If the editor indicates the entry of a new viewer 904, the appropriate viewer entry routines are enabled 909, and the opportunity to create viewer preferences for the new viewer is provided 911.

The routines to update/create new preferences 912 permit both a program specific or permanent updating of the selected viewer's preferences. Once viewer preferences are indicated, if any, the selected program's segment map is read 921 and compared to the preferences 922 to the extent that they are available.

If all the flagged segments are effectively excluded by the viewer preferences 922, than the resulting program segment table is saved 941 and the routine is exited. Otherwise, in addition to an initial segment table, a list is prepared 923 consisting of any flagged segments that have a descriptive level lower than the corresponding level in the preferences, and flagged segments for which there is no corresponding preferences. In the absence of viewer preferences every flagged segment is included in the segment list.

In a manner similar to the retrieval of non-sequential segments outlined previously, only the segments in the segment list are shown one after the other 931 as a continuous stream to the editor, pausing only if an include/exclude decision is not indicated 932. The process continuing automatically 934 until a decision on each of the flagged segments in the list is made 932. As each decision is made the segment table is updated 933. Alternatively, the segment table is updated and saved following the transmission of the last segment 941.

Each segment need not be viewed in its entirety 931, as soon as an include decision is made 932, the showing of the next segment begins instantaneously. Additionally, it should be understood that a showing of a flagged segment is not limited to, or indicate, the actual transmission of the flagged segment's video/sound. Appreciating that certain adults may not be interested in viewing the flagged segments, a character description of the contents of the segment may be provided instead or in advance of the option to view the corresponding segment.

The above is presented to emphasize the control features and capabilities of the present invention, the particular routines shown can be enhanced in a number of ways. Configuration routines are contemplated that further facilitate and automate viewer/player controls.

For example, a configuration can be selected that automatically creates for selected or new viewers/players a segment table excluding all flagged segments. In this case at system setup a viewer is simply associated with the exclusion of all flagged segments.

Similarly, additionally, or alternatively, a viewer/player is associated with a descriptor code paralleling the MPAA rating system as previously detailed with respect to FIG. 2D. At system setup a viewer/player is associated with an appropriate rating code, thereafter, the viewing/playing of a program is consistent with the rating code associated with the respective viewer. The simplicity of the architecture in combination with the teachings of the variable content program permits, for example, by means of a single code associated with each viewer, a parent to view an "R" version of a film, and permits a child to view a "G" version of the same film. It is noted that this architecture provides more tailored control than the simpler exclude all flagged segments architecture, but significantly less tailored control than a category specific video content preferences. In a preferred embodiment, the various structures detailed above are correlated to permit the application of a variety of content control options without requiring duplicating descriptor definition. For example a assigning a segment a descriptor other than "G" rating is equivalent to flagging the segment.

Clearly, a number of other interactive capabilities are made possible by the architecture of RAViT. For example during the viewing of a program, skip keys cause the automatic skipping of the present segment and the instantaneous viewing of the next logical segment. Other functions permit interactive modification of the segment map, such as flagging a segment, as the program is being viewed. It is intended that a number of other interactive capabilities be implemented which incorporate the teachings of prior art interactive and multi-media system. Specifically in this respect, the teachings of the patent to Bohrman, previously cited, are by reference incorporated herein.

Since the prior art is well established, and many of the features, components, and methods, found therein may be incorporated in the preferred embodiment; and since other modifications and changes varied to fit particular operating requirements and environments will be apparent to those skilled in the art, the invention is not limited to the presently preferred form of the present invention set forth here and above, it is to be understood that the invention is not limited thereby. It is also to be understood that the specific details shown are merely illustrative and that the invention may be carried out in other ways without departing from the spirit and scope of the following claims.

What is claimed is:

1. A video system comprising:
   preferencing means for preestablishing a content preference with respect to a level of explicitness in each of plurality of content categories;
   communication means for downloading segment information for a video comprising a linear sequence of frames readable from a spiral track of an optical disc, the segment information directly defining at least one segment of the video with respect to a level of explicitness in at least one content category;
   selecting means for selecting segments of the video by applying the preestablished content preference to the segment information; and
   random access and buffering means for playing from within the linear sequence of frames a seamless version of the video less in length than the length of the video, the playing not requiring an alternate video source and comprising retrieving the selected segments and seamlessly skipping a retrieval of an at least one segment by buffering at least a portion of a segment.

2. The system of claim 1 wherein the segment information is downloaded to the optical disc.

3. The system of claim 1 wherein the video is downloaded to the optical disc from a remote video source.

4. The system of claim 1 wherein the preestablishing is individualized for each of a plurality of viewers and is subject to a password control.

5. The system of claim 1 wherein a modification to the preestablished content preference is responsive to a permission specific with respect to a level of explicitness in each of the plurality of content categories.

6. A video system comprising:
   preferencing means for preestablishing a content preference responsive to a rating system;
   communication means for downloading segment information for a video comprising a linear sequence of frames readable from a spiral track of an optical disc, the segment information directly defining at least one segment of the video responsive to the rating system;
   selecting means for selecting segments of the video by applying the preestablished content preference to the segment information; and
   random access and buffering means for playing from within the linear sequence of frames a seamless version of the video less in length than the length of the video, the playing not requiring an alternate video source and comprising retrieving the selected segments and seamlessly skipping a retrieval of an at least one segment by buffering at least a portion of a segment.

7. The system of claim 6 wherein the segment information is downloaded to the optical disc.

8. The system of claim 6 wherein the video is downloaded to the optical disc from a remote video source.

9. The system of claim 6 wherein the preestablishing is individualized for each of a plurality of viewers and is subject to a password control.

10. The system of claim 6 wherein the preestablishing is individualized for each of a plurality of viewers and is subject to a password control; and wherein the video is downloaded to the optical disc from a remote video source.

11. A video playing method comprising the steps of:
    preestablishing a content preference with respect to a level of explicitness in each of plurality of content categories;
    downloading, by means of a communication, segment information for a video comprising a linear sequence of frames readable from a spiral track of an optical disc, the segment information directly defining at least one segment of the video with respect to a level of explicitness in at least one content category;
    selecting segments of the video by applying the preestablished content preference to the segment information; and
    playing, by means of a random accessing and buffering and from within the linear sequence of frames, a seamless version of the video less in length than the length of the video, the playing not requiring an alternate video source and comprising retrieving the selected segments and seamlessly skipping a retrieval of an at least one segment by buffering at least a portion of a segment.

12. The method of claim 11 wherein the segment information is downloaded to the optical disc.

13. The method of claim 11 wherein the video is downloaded to the optical disc from a remote video source.

14. The method of claim 11 wherein the preestablishing is individualized for each of a plurality of viewers and is subject to a password control.

15. The method of claim 11 wherein a modification to the preestablished content preference is responsive to a permission specific with respect to a level of explicitness in each of the plurality of content categories.

16. A video playing method comprising the steps of:
    preestablishing a content preference responsive to a rating system;
    downloading, by means of a communication, segment information for a video comprising a linear sequence of frames readable from a spiral track of an optical disc, the segment information directly defining at least one segment of the video responsive to the rating system;

selecting segments of the video by applying the preestablished content preference to the segment information; and playing, by means of a random accessing and buffering and from within the linear sequence of frames, a seamless version of the video less in length than the length of the video, the playing not requiring an alternate video source and comprising retrieving the selected segments and seamlessly skipping a retrieval of an at least one segment by buffering at least a portion of a segment.

17. The method of claim 16 wherein the segment information is downloaded to the optical disc.

18. The method of claim 16 wherein the video is downloaded to the optical disc from a remote video source.

19. The method of claim 16 wherein the preestablishing is individualized for each of a plurality of viewers and is subject to a password control.

20. The method of claim 16 wherein the preestablishing is individualized for each of a plurality of viewers and is subject to a password control; and wherein the video is downloaded to the optical disc from a remote video source.

* * * * *